(12) United States Patent
Nomura et al.

(10) Patent No.: US 6,417,497 B2
(45) Date of Patent: Jul. 9, 2002

(54) CHAOS APPLIED APPARATUS

(75) Inventors: Hiroyoshi Nomura, Shijonawate;
 Noboru Wakami, Hirakata; Kazuyuki Aihara, Narashino, all of (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/827,798

(22) Filed: Apr. 6, 2001

Related U.S. Application Data

(62) Division of application No. 09/271,228, filed on Mar. 17, 1999, now Pat. No. 6,239,416, which is a division of application No. 08/844,302, filed on Apr. 18, 1997, now Pat. No. 6,263,888, which is a continuation of application No. 08/278,384, filed on Jul. 21, 1994, now abandoned.

(30) Foreign Application Priority Data

| Jul. 22, 1993 | (JP) | ............................................. 5-181137 |
| Sep. 13, 1993 | (JP) | ............................................. 5-226955 |
| Oct. 29, 1993 | (JP) | ............................................. 5-271819 |

(51) Int. Cl.[7] ................................................ H05B 1/02
(52) U.S. Cl. ........................ 219/494; 219/497; 219/501
(58) Field of Search ................................ 219/497, 505, 219/494, 702, 745, 749, 751; 99/325–333

(56) References Cited

U.S. PATENT DOCUMENTS

| 1,649,179 A | | 11/1927 | Orr |
| 2,440,161 A | | 4/1948 | Vaudreuil |
| 4,455,480 A | * | 6/1984 | Matsumoto et al. ........ 219/497 |
| 4,636,605 A | | 1/1987 | Berend et al. |
| 5,064,981 A | | 11/1991 | Bolton |
| 5,182,426 A | | 1/1993 | Sklenak et al. |
| 5,342,401 A | | 8/1994 | Spano et al. |
| 5,465,219 A | | 11/1995 | Jeffers |
| 5,481,233 A | | 1/1996 | Manolache et al. |
| 5,506,795 A | | 4/1996 | Yamakawa |
| 5,560,230 A | | 10/1996 | Wang et al. |
| 5,727,448 A | * | 3/1998 | Sa ............................... 219/494 |

FOREIGN PATENT DOCUMENTS

| JP | 49-27723 | | 7/1974 |
| JP | 26609 | | 2/1977 |
| JP | 1-86959 | | 6/1989 |
| JP | 9108100 | * | 4/1997 |
| KR | 90-11568 | | 7/1990 |

OTHER PUBLICATIONS

"Chaos–Foundation and Application of Chaos", ed. By Kazuyuki Aihara, Science Co.
Sato et al., "Practical Methods of Measuring the General Dimension and the Largest Lyapunov Exponent in High Dimensional Chaotic Systems", Prog. Theor., Phys. vol. 77, No. 1, pp. 1–5, (1/87).
Parker et al., "Practical Numerical Algorithms for Chaotic Systems", pp. 18–29 and 66–82, Springer–Verlag.
Peitgen et al., "Chaos and Fractals New Frontiers of Science", Springer–Verlag, pp. 6–7, 509–517.
Chua, "Chaos–Foundation and Application of Chaos", Kazuyuki Aihara, Science Co., 40—(see Spec. pp. 40–41).
H. Nomura et al. "Chaotic Behavior of a 2–Link Nozzle in a Dishwasher", 1993 Jount Technical Conference on Circuits/Systems, Computers and Communications, pp. 276–281, Jul. 1993.

* cited by examiner

*Primary Examiner*—Mark Paschall
(74) *Attorney, Agent, or Firm*—Ratner & Prestia

(57) ABSTRACT

An apparatus and method for heating a microwave oven using a deterministic chaotic signal. The microwave oven includes a heating compartment, a magnetron for generating microwaves, a waveguide for directing the microwaves into the heating compartment and a chaotic signal generator for driving the magnetron. The characteristics of the chaotic signal are adjusted to tend to vary the output energy of the magnetron and increase the uniformity of the microwaves in the heating compartment.

11 Claims, 35 Drawing Sheets

PRIOR ART

921 Upper heater
Lower heater 922
Heating compartment
923 Power source circuit
924 Output control circuit
1 Chaos signal generating circuit 932 Lid
931 Inner bowl
933 Heater
934 Power source circuit
935 Output control circuit
1

CHAOS APPLIED APPARATUS

This application is a division of U.S. Pat. application No. 09/271,228, filed Mar. 17, 1999, now U.S. Pat. No. 6,239,416 which is a division of U.S. Pat. application Ser. No. 08/844,302 filed Apr. 18, 1997, now U.S. Pat. No. 6,263,888, which is a continuation of U.S. Pat. application Ser. No. 08/278,384 filed Jul. 21, 1994, now abandoned.

BACKGROUND OF THE INVENTION

Related Art of the Invention

The prior art is described below while referring to an example of dish washer.

A conventional dish washer is shown in FIG. 14. Reference numeral 1010 denotes a body of a dish washer, 1020 is a lid through which dishes are put inside the dish washer, 1030 is a feed water hose for feeding water into the dish washer, 1040 is a nozzle drive pump for pressurizing water from the feed water hose 1030, 1050 is a rotary nozzle, 1060 is a drain pump for discharging water collected inside, 1070 is a drain hose for leading wastewater to outside of the dish washer, and 1080 is a control circuit for controlling the operation timing of the nozzle drive pump 1040 and drain pump 1060. In thus constituted conventional dish washer, the water supplied from the feed water hose 1030 is pressurized by the nozzle drive pump 1040, and is supplied into the rotary nozzle 1050.

A conventional example of the rotary nozzle 104 is shown in FIG. 15. FIG. 15 is a top view of the rotary nozzle 105, which comprises four water injection ports (A, B, C, D). The water injection direction at each injection port is set in the horizontal direction to the plane of rotation of the nozzle in A, and in the vertical direction to the plane of the nozzle in B, C, D. Therefore, by the reaction of water injection from the injection port A, the nozzle is put into rotation, while the dishes are washed by the injection of water from the other injection ports (B, C, D). Thus, the nozzle injects water to the dishes while rotating.

The water injected to the dishes is collected in the drain pump 1060, pressurized, and discharged outside through the drain hose 1070. The nozzle drive pump 1040 and drain pump 1080 are controlled by the control circuit 1080, so as to be controlled at adequate operation timing depending on the cleaning process such as dish washing, rough rinsing and final rinsing.

The rotation trajectories of the injection ports of the conventional rotary nozzle 1050 are shown in FIG. 16. As clear from FIG. 16, the nozzle makes simple rotations, and the trajectory of injection port is a complete circle. Therefore, the water injected from the rotary nozzle 1050 hits only a limited area of a dish, and sufficient washing effect is not obtained depending on the configuration of dishes, or water does not permeate into narrow gaps of dishes.

SUMMARY OF THE INVENTION

In the light of such background, it is hence a primary object of the invention to present a rotary nozzle apparatus capable of driving the nozzle by applying the chaos technology so as to inject water uniformly to the object.

To achieve the object, the invention presents a rotary nozzle apparatus comprising a pump for pressurizing a fluid, a nozzle composed of plural rotatable hollow links which are mutually in passing through, and at least one fluid injection port in at least one hollow link of the nozzle, in which the fluid is injected from the injection port while rotating the hollow link by the force of the fluid pressurized by the pump, and the shape, weight, and position of center of gravity of the link, the fluid injection angle of the injection port, and the pressurizing pattern of the pump are adjusted, so that the motion of the nozzle is set in chaotic state.

Chaos is characterized by unstable trajectory (see T. S. Parker, L. O. Chua: Practical Numerical Algorithm for Chaotic System, Springer-Verlag, 1989), the nozzle in chaotic state never passes the same trajectory. Therefore, the nozzle in chaotic state is capable of sprinkling water more uniformly as compared with the conventional nozzle.

BRIEF DESCRIPTION OF THE DRAWINGS

FIG. 10 is a diagram showing the constitution of connections of the third embodiment.

A detailed structure of the two-link rotary nozzle 2000 is shown in FIG. 1 ($b$). The upper half of FIG. 1 ($b$) is a top view of the two-link rotary nozzle 2000, and the lower half is a side view.

The links and link connection parts are hollow, and the water coming supplied up to the water intake port beneath the first link passes through the inside of the hollow link, and can reach up to the injection port of the first link or second link. Incidentally, the two links in the diagram are coupled at the center 02, and the second link 2-2 is free to rotate at the center 02. The water intake port of the first link is connected to the object machine, but the first link 2-1 is free to rotate at the center 01.

In thus composed rotary nozzle apparatus, the operation is described below.

First, water is pressurized by the nozzle drive pump 1000, and is supplied into the water intake port of the two-link rotary nozzle 2000. The supplied water passes through the inside of the first link and second link, and is injected from the injection ports A to F. The water injection direction from each injection port is the upward direction to the plane of rotation of the nozzle in B, C, D, E, and in the lateral direction in A and F.

Figure 1A:
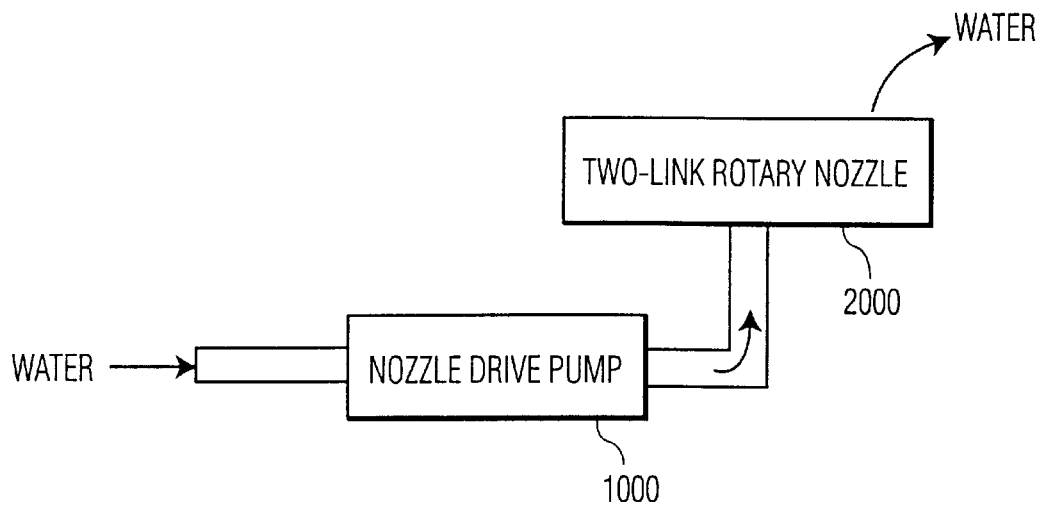
FIGS. 1(a) and 1(b) are diagrams showing a rotary nozzle apparatus in a first embodiment of the invention.
Figure 1B:
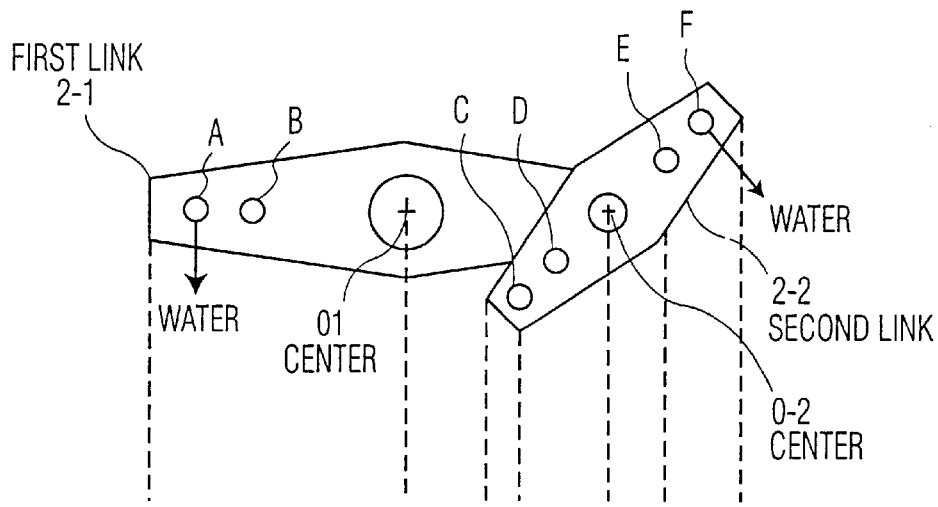
Figure 1C:
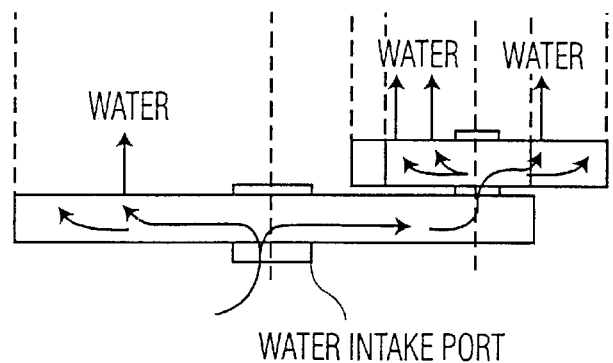
As shown in FIG. 1 ($b$), the two-link rotary nozzle 2000 is composed of two links (first link 2-1, second link 2-2). Each link has plural injection ports, which are expressed by symbols A to F in FIG. 1 ($b$). The direction of blowing water from each injection port differs in each injection port.

FIG. 1 ($b$) shows the water injection direction at each injection port by arrow. The injection ports B, C, D, E blow out the water in the direction vertical to the plane of rotation of the nozzle, and wash the dishes. On the other hand, the injection ports A and F blow out the water in the direction parallel to the plane of rotation of the nozzle, so that the nozzle can be rotated by the reaction of the injected water.

In this way, by inclining the water blowing direction from several injection ports in the rotatable directions of the nozzle, a rotary force can be applied to the links, and the nozzle can inject water while rotating.

Figure 15:
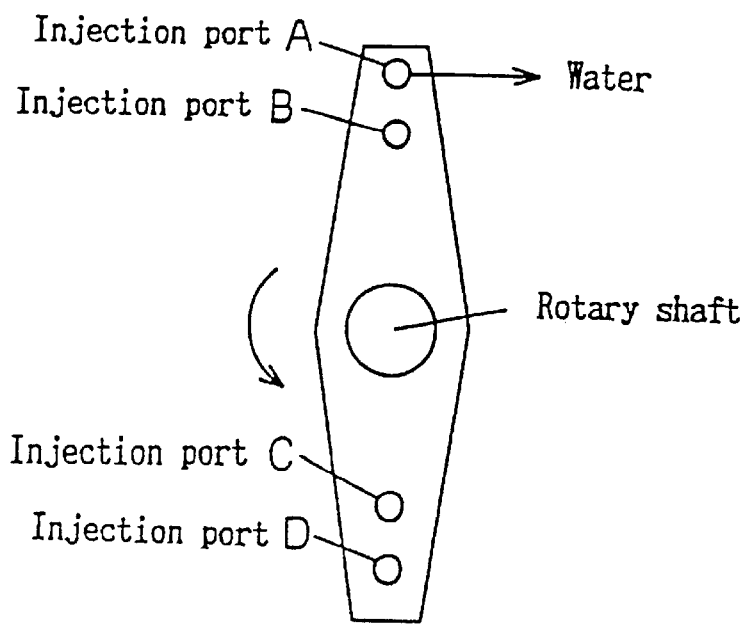
FIG. 15 is a diagram showing a constitution of a conventional rotary nozzle.
Figure 16:
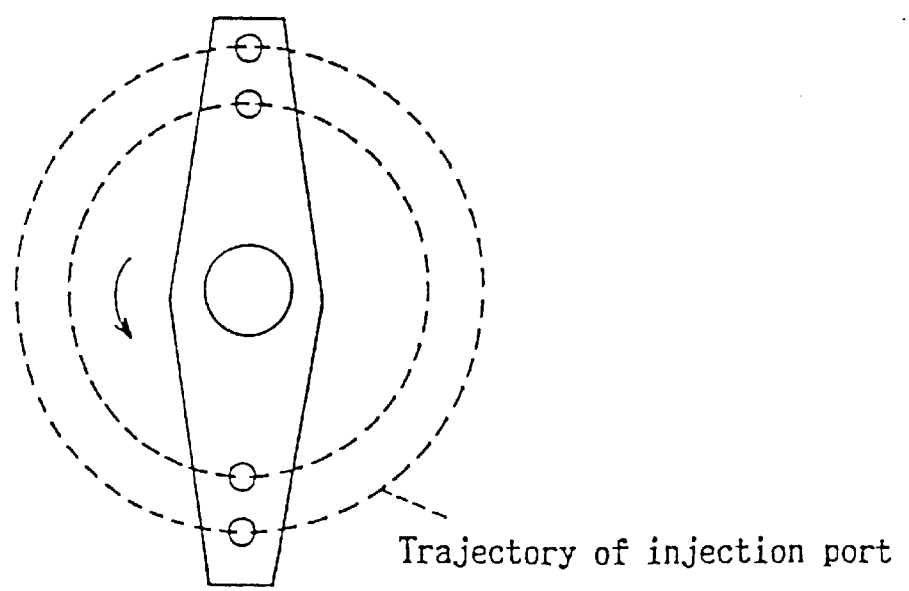
FIG. 16 is a diagram showing a constitution of connection of the fifth embodiment.

In the conventional rotary nozzle apparatus shown in FIG. 15, since water is injected parallel to the plane of rotation of the link, water is injected while rotating. However, in the conventional rotary nozzle apparatus, since there is only one link, the trajectory of the injection port is a simple circle.

In the embodiment, by contrast, the nozzle is composed of two links, and the rotary trajectory of the injection port on the second link is more complicated than the conventional circular trajectory.

Figure 2A:
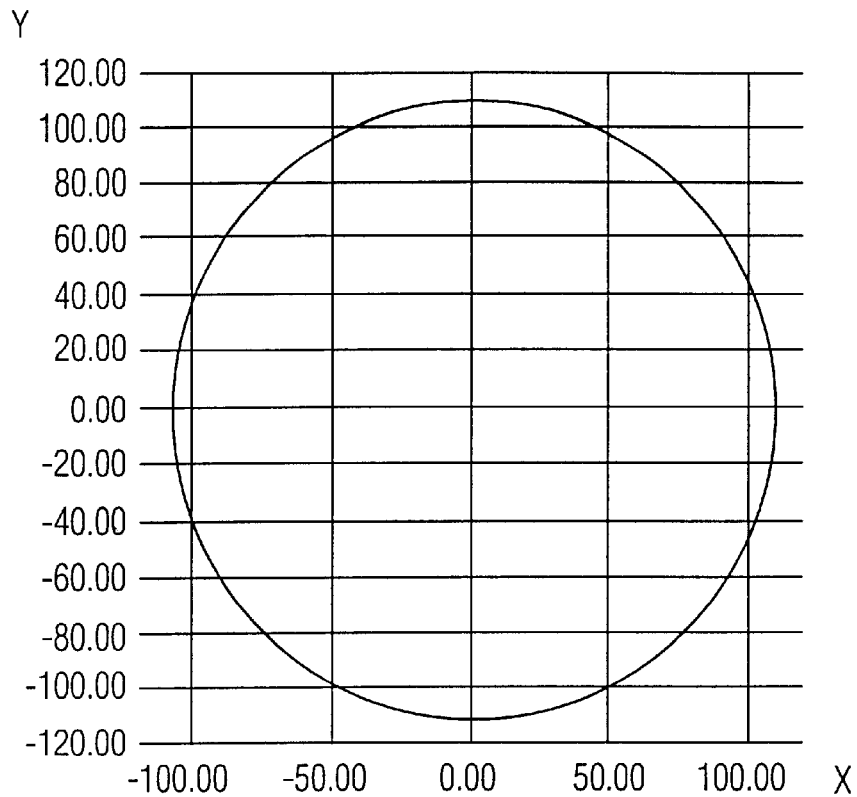
FIGS. 2(a) and 2(b) are explanatory diagrams of a one-link nozzle trajectory and a two-link nozzle trajectory, respectively.
Figure 2B:
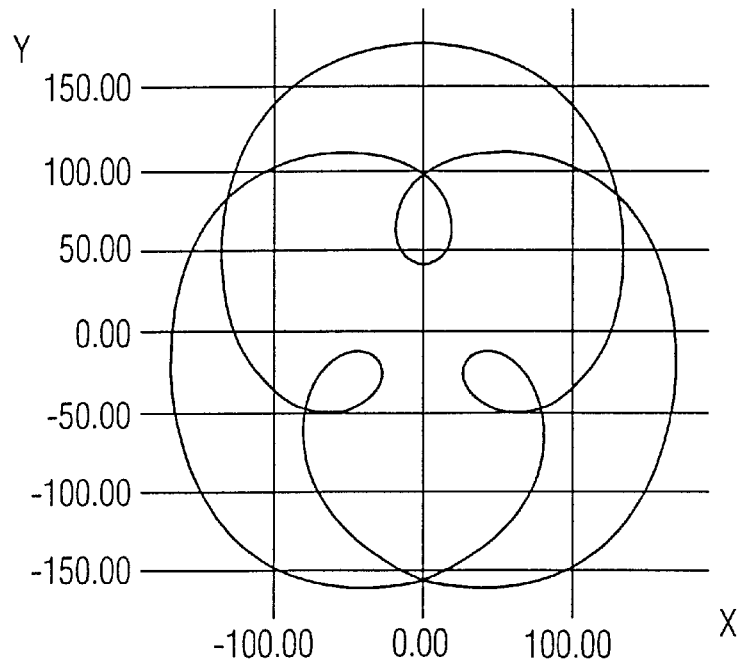

A simulation result of rotary trajectory of the injection port D in the conventional rotary nozzle apparatus in FIG. 15 is shown in FIG. 2 ($a$), and a simulation result of the injection port C on the second link 2-2 of the two-link rotary nozzle 2000 is shown in FIG. 2 ($b$). In FIG. 2 ($b$), however, the structure of the first link 2-1 and second link 2-2 of the two-link rotary nozzle is designed to be symmetrical about the center of rotation of each link (in this case, the center of rotation of each link coincides with the position of the center of gravity of each link), and the water injection direction of the injection ports A and F is a completely lateral direction, from which the simulation result is obtained, and accordingly, in this case, the ratio of the rotating speed of the first link 2-1 to the rotating speed of the second link 2-2 is constant, being about 2:5 in this case.

As known from FIG. 2, the injection port of the conventional rotary nozzle apparatus moves on one circumference, while the nozzle is making more complicated actions in the embodiment.

In the case of FIG. 2 ($b$), the rotation is periodic, and whatever time may pass, the injection port will not pass other than the trajectory shown in FIG. 2 ($b$). In the two-link rotary nozzle 2000, however, by changing the design of the link and injection port, it is possible to drive more complicatedly than in FIG. 2 ($b$).

As the more complicated state of trajectory, the chaotic state is known. The chaos herein means a deterministic chaos, and refers to a state which appears to be very unstable and random although a complete equation of motion is described. That is the chaos state is not "at random" but it does not take same track for ever in theory, that is, it does not take periodical track. The motion of a device having plural links, such as the two-link rotary nozzle 2000 can be transformed into a chaotic state. For example, a manipulator with two or more links or a double pendulum is known to be transformed into a chaotic state (see Nagashima & Baba: Introduction to Chaos, Baifukan 1992 Cin Japanese).

Chaos is basically characterized by unstable trajectory, and will never pass the same trajectory again. Therefore, by setting the two-link rotary nozzle into chaotic state, water can be injected more uniformly.

As the index of chaotic state, the chaos feature amounts such as the fractal dimension and Lyapunov exponent are known. By varying the water injection direction of the injection port, or the center of gravity, shape or weight of the link in order that these values may be appropriate, the two-link rotary nozzle can be set in chaotic state.

Herein, as an example, a method of determining the water blowing direction of the injection port, the shape and position of center of gravity of the link by using the largest Lyapunov exponent is shown.

The Lyapunov exponent is a numerical value showing how sensitive is the state trajectory to the initial value, and in particular when the largest Lyapunov exponent is a positive value, it is known that the system behaves chaotically. Several methods have been already proposed at academic meetings for calculating the Lyapunov exponent. Herein, the largest Lyapunov exponent is calculated by the method proposed by Sato et al. (S. Sato, M. Sano, Y, Sawada: "Practical methods of measuring the generalized dimension and the largest Lyapunov exponent in high dimensional chaotic system" Prog. Theor. Phs., Vol. 77, No. 1, January 1987)

Figure 3:
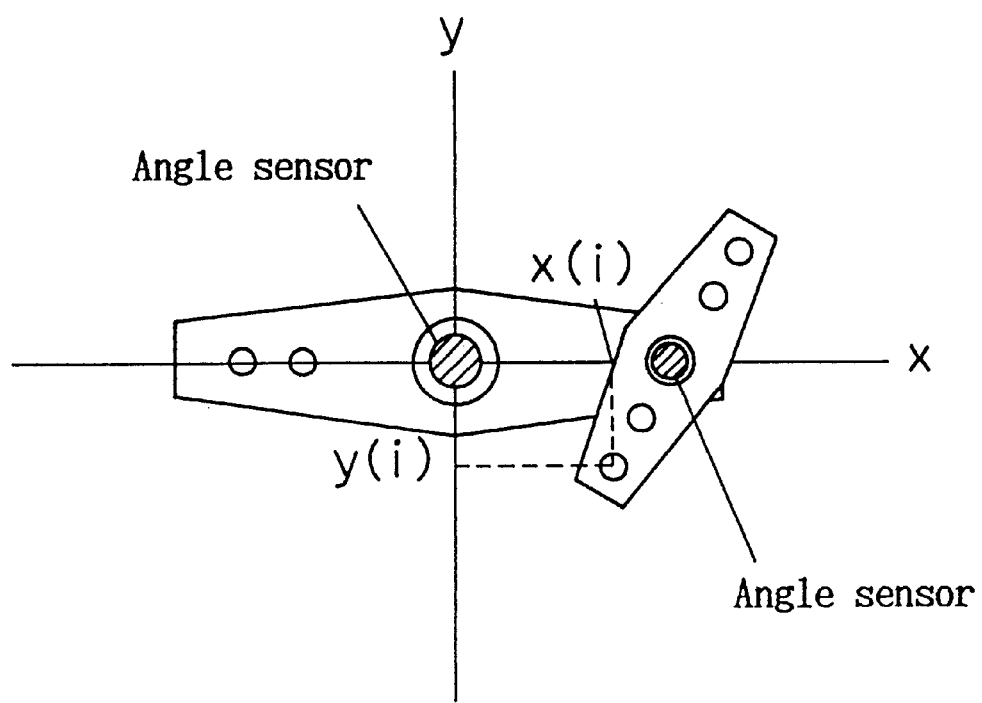
FIG. 3 is an explanatory diagram of a method for detecting motion of the nozzle.

Suppose, as shown in FIG. 3, an angle sensor is attached to the two-link rotary nozzle 2000 so as to detect the rotational angle of the first link and second link, individually. From the detected rotational angle, the position of the front end of the second link can be easily calculated, and the position is expressed as x(i), y(i), where i refers to the time. From the nozzle front end position x(i), consequently, a time series vector X(i)={x(i), x(i+T), x(i+2T), . . . , x(i+(d−1)xT)} is created, and an attractor is recomposed, where d denotes the dimension of the time series vector, and T is the time lag amount. Both d and T are set at proper values. At this time, selecting a proper hyper plane in an d-dimensional space, and a vector X(i)–X(i+1) crossing this hyper plane is determined. The coordinates of the intersection on the hyper plane is determined as the point of interior division of X(i) and X(i+1), and a set on the plane {Xp1, Xp2, . . . , Xpk, . . .} is created. In this set, all pairs of which distance is not more than the specified threshold value E are selected, and two points among them are expressed as Xpk, Xpk'. At this time, the largest Lyapunov exponent L is calculated in the following formula.

$$L(tau) = \frac{1}{tau} \frac{1}{Np} \sum_{K=1}^{Np} \frac{|Xpk + tau - Xpk' + tau|}{|Xpk - Xpk'|} \quad (1)$$

where Np denotes the total number of data pairs of which distance is not more than the threshold value E.

In formula (1), it is known that L(tau) converges when the value of tau is increased. The value of L(tau) when converging is the largest Lyapunov exponent. Other methods are also proposed for calculating the largest Lyapunov exponent (for example, T. S. Parker, L. O. Chua: Practical Numerical Algorithm for Chaotic System, Springer-Verlag, 1988). If calculated in other methods, the same effects as in the embodiment will be obtained.

By repeating such calculation as to determine the largest Lyapunov exponent while varying the angle of injection port on the second nozzle, or the center of gravity of link, etc., it is possible to find the moment when the largest Lyapunov exponent becomes a positive value not zero.

By conforming to the design of the injection port and link when the largest Lyapunov exponent becomes positive, the nozzle can drive the chaotic state.

Figure 4:
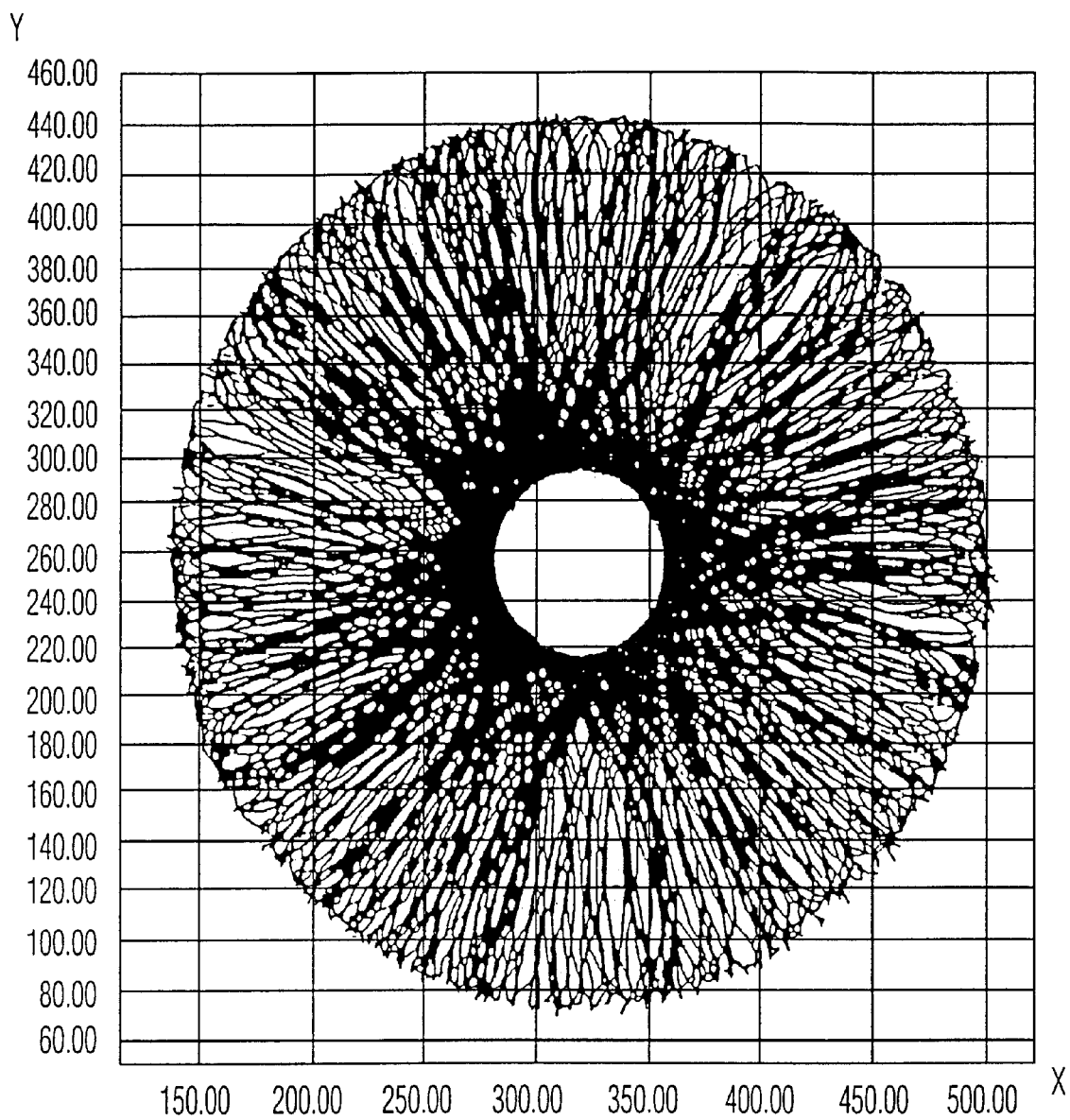
FIG. 4 is an operation trajectory diagram of the rotary nozzle in chaotic state.
Figure 5D:
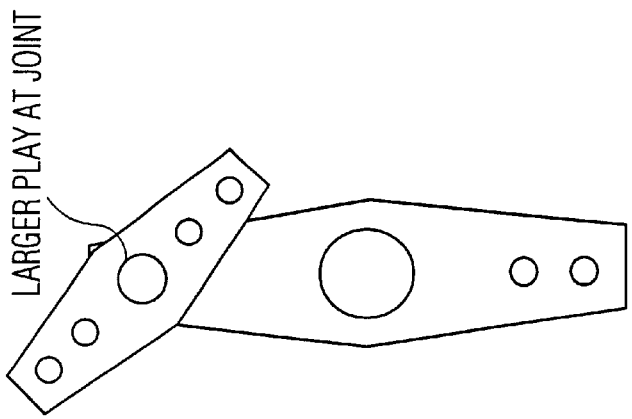
FIGS. 5(a), 5(b), 5(c) and 5(d) are diagrams showing rotary nozzles having the same effects as the rotary nozzle in the first embodiment.
Figure 5C:
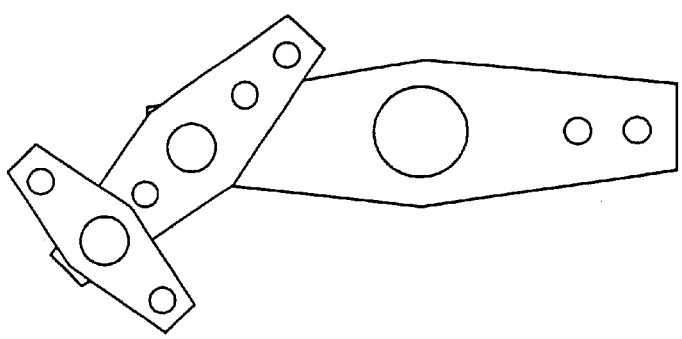
Figure 5B:
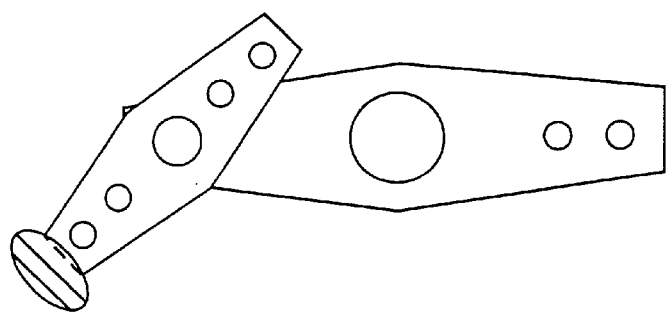
Figure 5A:
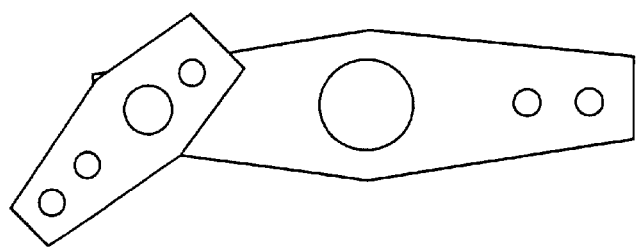

FIG. 4 shows the trajectory of the injection port C of the two-link rotary nozzle in chaotic state. FIG. 4 is not obtained by numerical calculation, but is obtained by the angle sensors in FIG. 3 when the actual machine of the two-link rotary nozzle 2000 is set in chaotic state.

As clear from FIG. 4, the nozzle passing region is increased from the state in FIGS. 2 (a), (b), and it is known that water can be sprinkled uniformly.

Incidentally, it is only in the design stage of the nozzle alone that the angle sensor is installed as shown in FIG. 3, and it is not needed in the shipped product and in ordinary operation, and the rotary nozzle apparatus is constituted as shown in FIG. 1.

As described so far, according to the embodiment, using a nozzle composed of two links, by properly setting the water injection direction of the nozzle, or the position of center of gravity, weight or shape of the links, the motion of the nozzle can be set in chaotic state. The nozzle in chaotic state is unstable in trajectory, and does not pass the same trajectory again. Therefore, water can be sprinkled uniformly, and also by investigating the chaos feature amount such as the Lyapunov exponent, the nozzle can be set in an appropriate chaotic state.

In this embodiment, meanwhile, as the parameter of the nozzle to be changed, the water blowing angle of the injection port, the position of center of gravity and weight of the link, and the like were used. Therefore, the nozzle motion can be always set in chaotic state and uniform washing is realized even when, as shown in FIG. 5, (a) the position of center of gravity of the second link is varied, (b) the position of center of gravity is changed by putting a weight on the second link, (c) multiple links are used instead of two, or (d) the play in the joint between the first link and second link is increased so that the center of rotation or center of gravity of the link may vary depending on the flow of water.

Also in the embodiment, although the largest Lyapunov exponent is used as the method for judging the chaotic state, the same effect is obtained by using other feature amount such as the fractal dimension. In particular, the fractal dimension is excellent as a method of judging the chaotic state. The fractal dimension indicates the self-similarity of obtained data, and a non-integer dimension is presented in chaos. As the fractal dimension, several dimensions are proposed, including information dimension, capacity dimension and correlation dimension. Among these dimensions, the correlation dimension is widely employed because the calculation is easy.

The correlation dimension was first proposed by Grassberger and Procaccia in 1983, and it is determined by using the correlation integral. The correlation integral C(r) is determined in the following formula.

$$C(r) = \frac{1}{N*N} \sum_{i,j}^{N} H(r - |X(i) - X(j)|) \quad (2)$$

where X(i) is the time series vector defined above, H denotes Heaviside function, and N is the total number of time series vectors.

when the correlation integration C(r) has the following relation, D is called the correlation dimension.

$$\log C(r) = D \log r + Q \quad (3)$$

where Q is a constant. To determine the correlation dimension, first, C(r) is calculated by Eq.(2) ,for some vlues of r , then the least square method is applied to the calculated data of log C(r) and log r to obtain the proportional constant D. The obtained D converges as the value of the dimension number d of vector X is increased. When converging sufficiently, D is the final calculation result of the correlation dimension. Therefore, while varying the design items of the two-link rotary nozzle 2000, such as water injection angle of injection port and position of center of gravity of the link, by repeating the calculation to find the correlation dimension, it is possible to find the moment when the correlation dimension takes a proper value (non-integer). By setting the two-link rotary nozzle in the situation at this time, the chaotic state can be driven.

As mentioned above, for fractal dimension, various calculation methods are proposed for various dimensions, aside from correlation dimensions, including capacity dimension and information dimensions, but if determined by employing other methods, the same effects as in the embodiment are obtained, that is, uniform water sprinkling capability is achieved.

Figure 6:
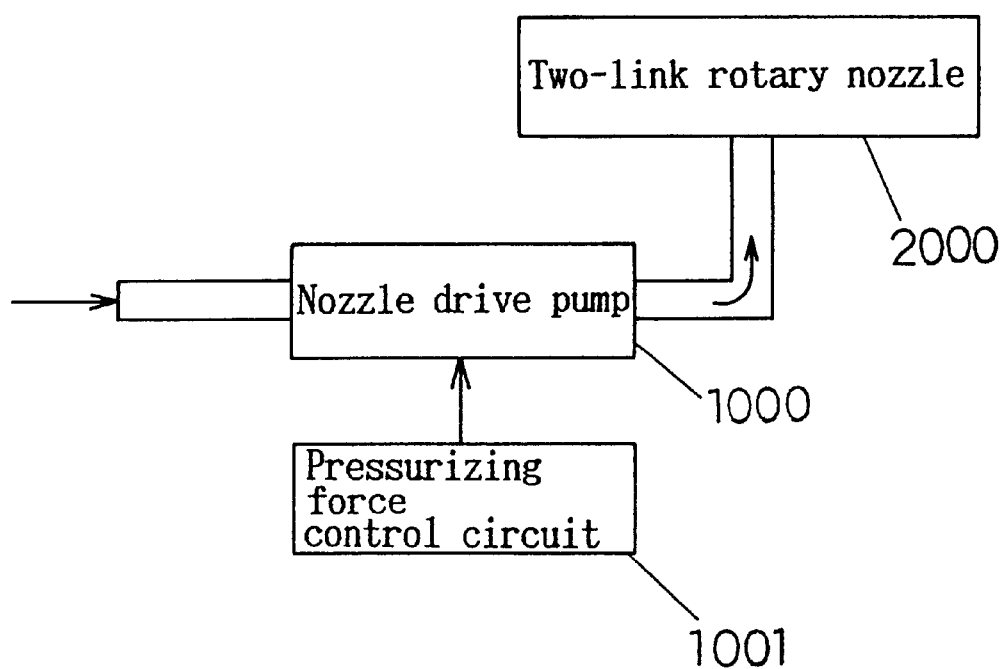
FIG. 6 is a diagram showing a constitution of a rotary nozzle apparatus in a second embodiment.

FIG. 6 is a structural diagram of a rotary nozzle apparatus in a second embodiment of the invention. Reference numeral 1000 is a nozzle drive pump for pressurizing supplied water, and 2000 is a two-link rotary nozzle which is rotated by the force of the water pressurized by the nozzle drive pump 1000 so as to inject water, and they are same as in the constitution of the first embodiment. What is different from the first embodiment is that a pressurizing force control circuit 1001 for controlling the pressurizing force of the nozzle drive pump 1000 is provided. In thus constituted rotary nozzle apparatus, the operation is described below.

In the first embodiment, it is explained that the two-link rotary nozzle is set in chaotic state by properly designing the water injection angle of the injection port, center of gravity of link, etc. The nozzle in chaotic state is unstable in trajectory, and always varies in trajectory, never passing the same trajectory again. Therefore, as compared with the nozzle making periodic motions, it is possible to sprinkle water more uniformly.

It is known that a chaotic state is more likely to occur in a system having a higher degree of freedom. In this embodiment, as a system capable of realizing chaotic state more easily, an explanation is given to the rotary nozzle apparatus increased in the degree of freedom of system by varying the pressurizing force of the nozzle drive pump 1000 by means of the pressurizing force control circuit 3.

Figure 7A:
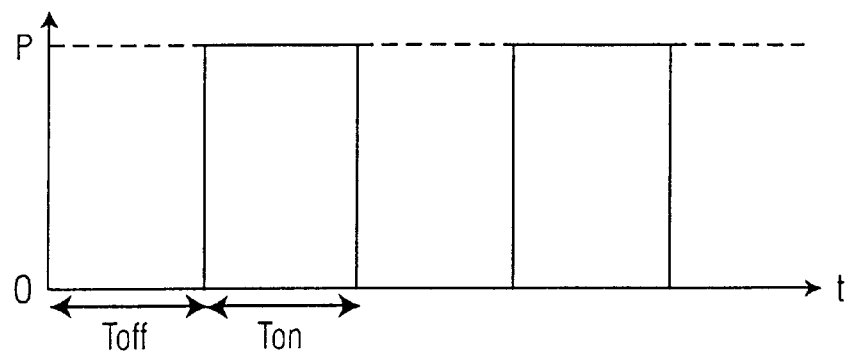
FIGS. 7(a), 7(b) and 7(c) are diagrams showing changing patterns a pressurizing force.
Figure 7B:
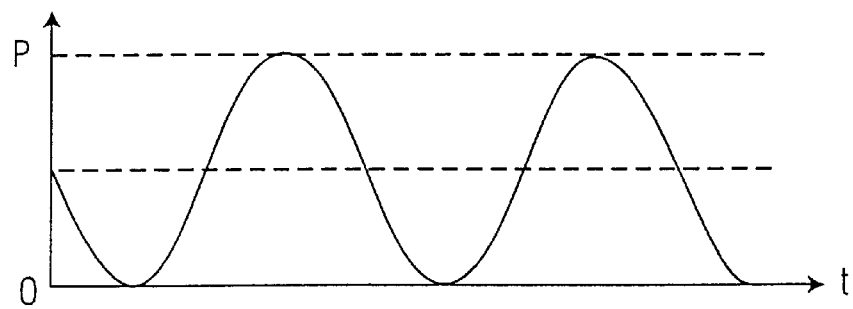
Figure 7C:
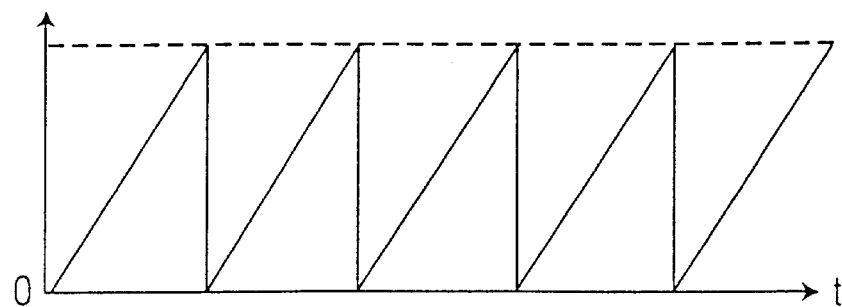

When the output of the nozzle drive pump 1000 is varied by the pressurizing force control circuit 1001 as shown in FIG. 7, the degree of freedom of the entire rotary nozzle apparatus increases, and the nozzle easily changes to a chaotic state. In FIG. 7, the axis of abscissas denotes the time, and the axis of ordinates represents the pressurizing force of the nozzle drive pump 1000, showing examples of three kinds of pressurizing force changing pattern, (*a*), (*b*), (*c*). FIG. 7 (*a*) shows repetition of ON and OFF, (*b*) changes in trigonometric function, and (*c*) changes in sawtooth waves.

By using any one of these pressurization patterns, the two-link rotary nozzle is easily set in chaotic state. In this way, by varying the pressurizing force of the nozzle drive pump 1000 relatively to the time by means of the pressurizing force control circuit 1001, the nozzle can be set in chaotic state.

As explained herein, according to the embodiment, using the two-link rotary nozzle, by changing the pressurizing force of the nozzle drive pump 1000 by means of the pressurizing force control circuit 1001, the nozzle behavior can be set in chaotic state. The nozzle set in chaotic state is unstable in behavior, and does not pass the same trajectory again. Therefore, uniform water sprinkling is realized.

Or, by combining with the method disclosed in the first embodiment, while investigating the chaos feature amount such as Lyapunov exponent, the pressurizing pattern of the nozzle drive pump 1000 may be varied, or the water injection direction of injection port, or the position of center of gravity of link may be changed, so that the nozzle may be set in a proper chaotic state. In this case, since the feature amount such as Lyapunov exponent is detected, the degree of chaos may be properly set, and when applied in a dish washer, a further effect is brought about in the aspect of washing speed.

Examples of pressurizing pattern of the pressurizing force control circuit 1001 are shown in FIG. 7, but other patterns than shown in FIG. 7 may be also used. In particular, a pressurizing pattern generated by such a function as to produce a chaos signal directly may be used. By way of illustration thereof, an example of pressurizing pattern by logistic function known well as chaos signal is shown below.

Supposing the time to be t and the pressurizing force of the nozzle drive pump 1000 to be p(t) (the variable range of pressurizing force, $0 \leq p(t) \leq P$, the following function is assumed to be a pressurizing pattern.

$$p(t+T)=4*p(t)*(1-p(t)/P) \qquad (4)$$

Herein, a logistic function is directly expressed as a pressurizing force, and when the pressurizing force of the nozzle drive pump 1000 is controlled by using this formula (4), the nozzle behavior comes in chaotic state. Incidentally, the same effect as in the embodiment is obtained when the pressurizing force of the nozzle drive pump 1000 is controlled by using other functions that produce chaos signal other than logistic function, such as tent function, Bernoulli shift, and intermittent chaos.

Figure 8:
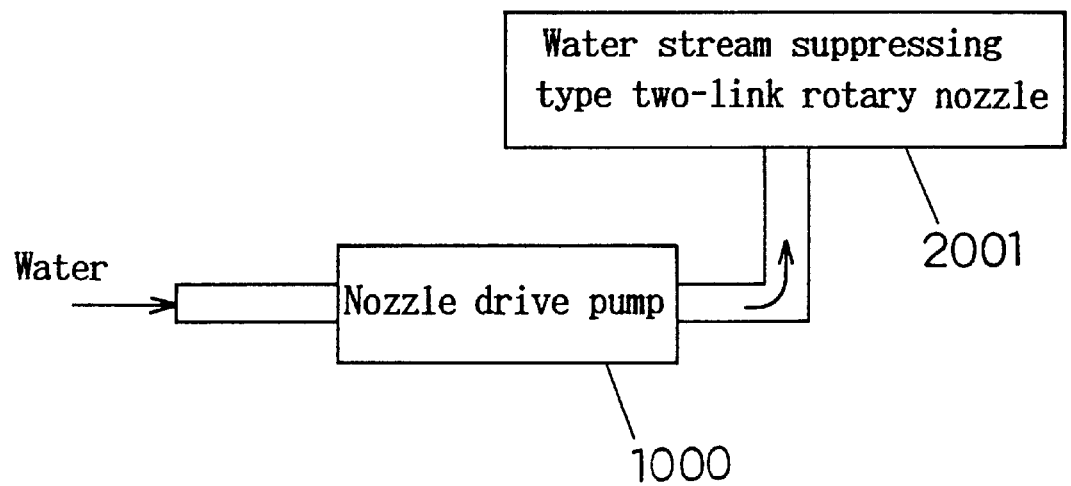
FIG. 8 is a diagram showing a constitution of a rotary nozzle apparatus in a third embodiment.

FIG. 8 is a structural diagram of a rotary nozzle apparatus in a third embodiment of the invention. Reference numeral 1000 is a nozzle drive pump for pressurizing supplied water, which is same as in the first embodiment. What differs from the first embodiment is that the two-link rotary nozzle 2000 is modified into a water stream suppressing type two-link rotary nozzle 2001. In thus constituted rotary nozzle apparatus, the operation is described below.

A chaotic state is more likely to occur when the degree of freedom of the object system is higher. In the second embodiment, by varying the output of the nozzle drive pump 1000, the degree of freedom of the entire nozzle drive device is increased, and a chaotic state is produced. In other method of increasing the degree of freedom of the system, for example, the structure of the joint of each link can be changed.

In this embodiment, the link joint structure is modified, and the rotary nozzle apparatus is set in chaotic state as described below.

Figure 9A:
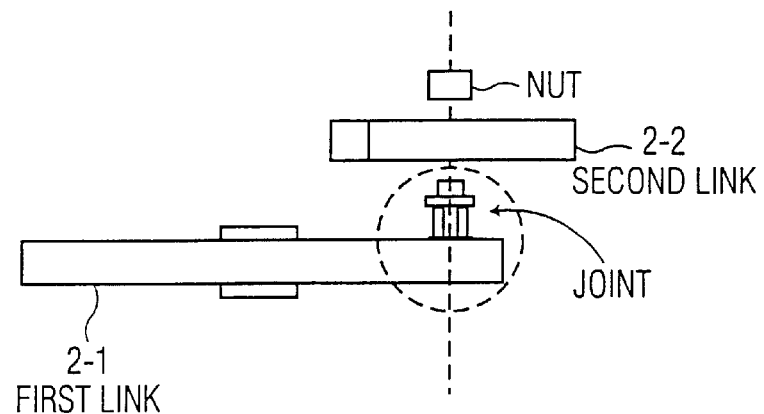
FIGS. 9(a) and 9(b) are diagrams showing the constitution of connection of the first embodiment.
Figure 9B:
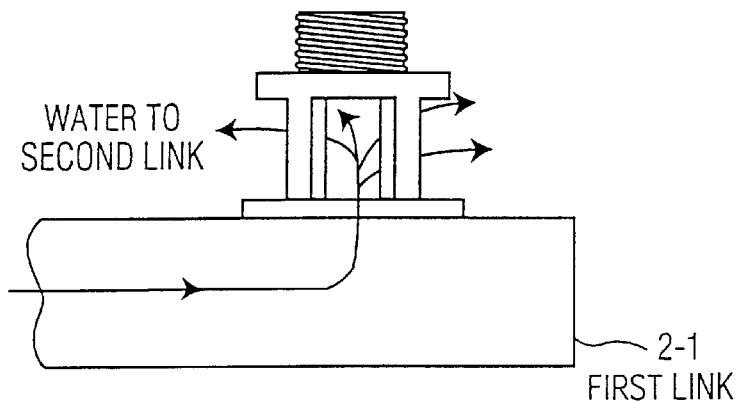
Figure 9C:
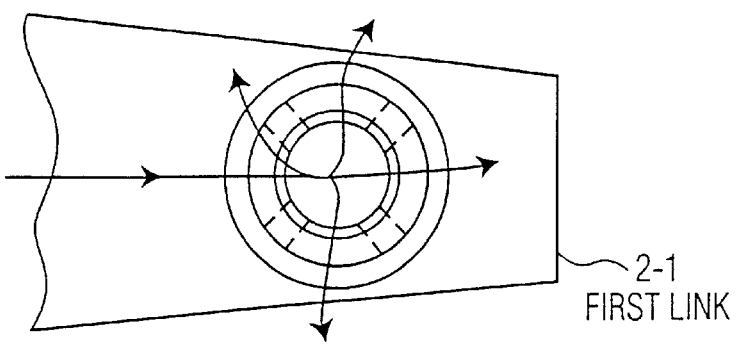

The structure of the joint part of the link of the rotary nozzle apparatus disclosed in the first embodiment is as shown in FIG. 9.

FIG. 9 (1) shows the structure of the joint of the first link 2-1 and second link 2-2 of the two-link rotary nozzle 2000. Usually, the second link 2-2 is put on the joint enclosed by a circle, and fixed with nut so that the second link 2-2 may not be separated from the first link 2-1. However, the second link 2-2 is free to rotate.

FIGS. 9 (*a*), (*b*) are magnified views of the circle enclosed portion (joint) of the first link 2-1 in FIG. 9 (1), showing a side view in FIG. 9 (*a*) and a top view in (b). In the joint shown in FIG. 9, in order that water may flow smoothly from the first link to the second link, four large holes are provided in the joint, and water can be guided from the first link to the second link with a small resistance.

Figure 10A:
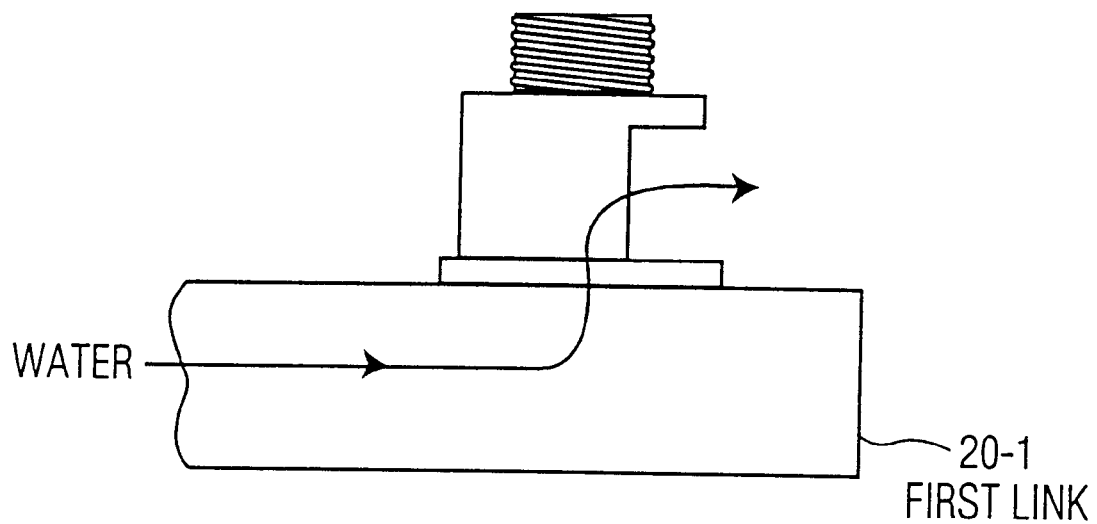
FIGS. 10(a) and 10(b) are diagrams showing the constitution of connections of the third embodiment.
Figure 10B:
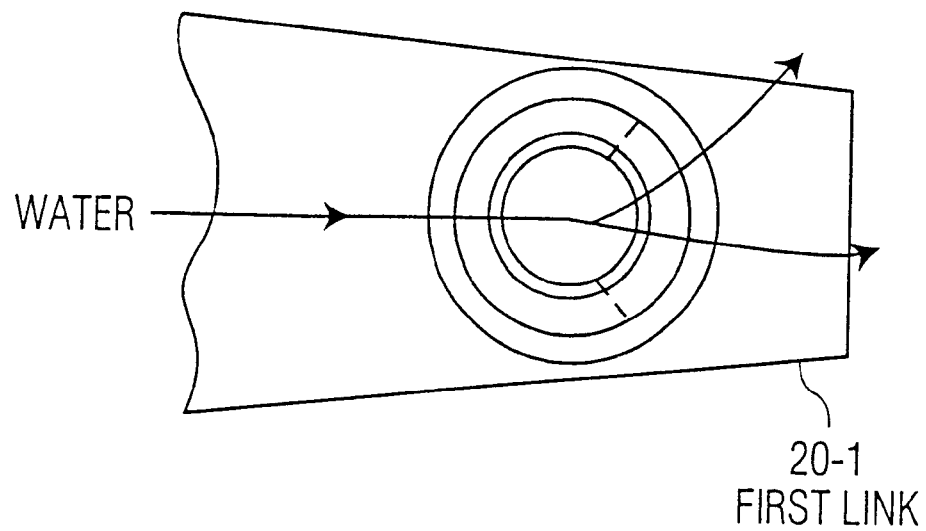

By contrast, in the third embodiment, there is a water stream suppressing type two-link rotary nozzle 2001 having a joint structured as shown in FIG. 10. As clear from FIG. 10, this water stream suppressing type two-link rotary nozzle 2001 has a fewer number of holes in the joint as compared with the first embodiment, and the water flow in the joint area is limited almost in one direction.

In the joint structure in FIG. 9, the total area of holes is wide, and the water resistance in the joint hardly changes regardless of the angle formed by the first link and second link. On the other hand, in the water stream suppressing type two-link rotary nozzle 2001, since the water flow is limited almost in one direction in the joint area as shown in FIG. 10, the water injection force varies depending on the relative position of the links.

Figure 11A:
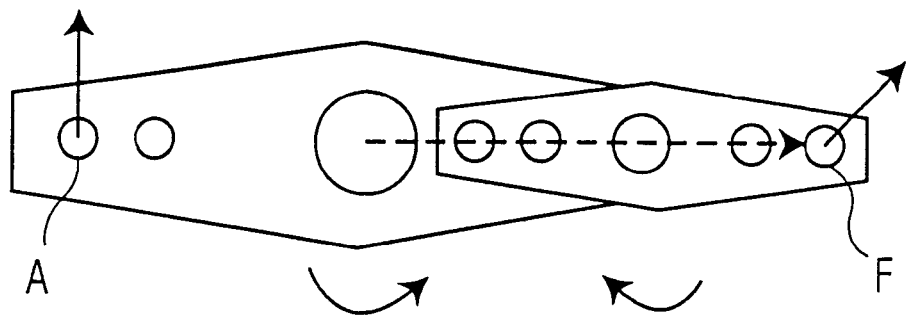
FIGS. 11(a) and 11(b) are explanatory diagrams showing changes in intensity of injected water depending on the rotation of the link.
Figure 11B:
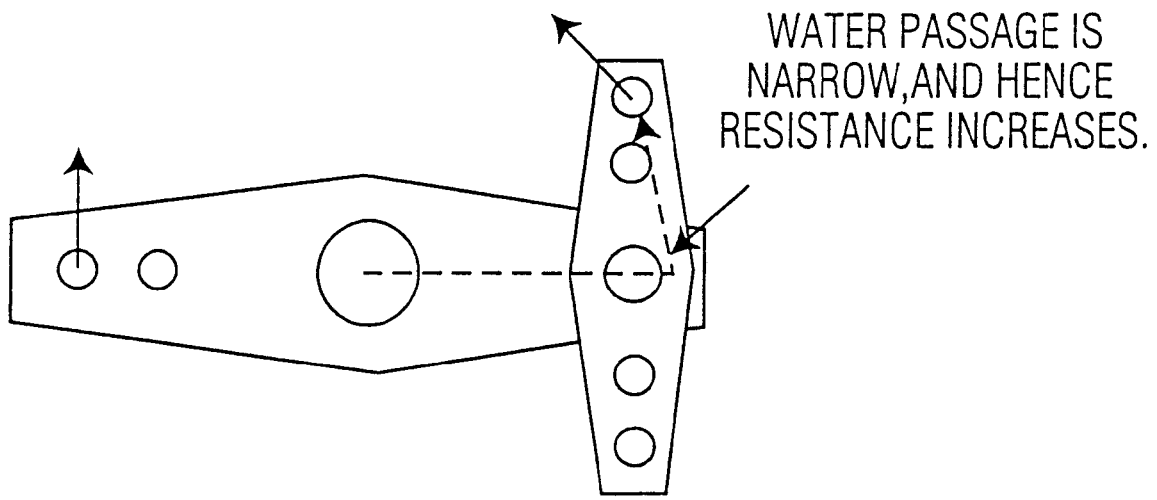

Change of injection force of water depending on the relative position of the links in the water stream suppressing type two-link rotary nozzle is explained with reference to FIG. 11. In FIG. 11 (*a*), the second link 20-2 is positioned almost in the same direction as the first link 20-1. At this time, the water flow up to the injection port F is indicated by dotted line in the diagram. Since the joint of the first link is as shown in FIG. 10, the resistance to water flow up to the injection port F is small, and the water is injected from the injection port F gushingly.

In FIG. 11 (*b*), the angle formed by the second link 20-2 and first link 20-1 is about 90 degrees. In this case, the water flow up to the injection port F is bent as indicated by dotted line. At this time, since the joint of the first link is structured as shown in FIG. 10, the water flow is bent more than expected in a certain point. The bending portion is narrow in the water path as compared with the case in (*a*), and the resistance to water flow increases. Therefore, the gush of water injected from the injection port F drops, while the gush of water from the injection port of the first link where water is easy to pass is increased.

Thus, by using the water stream suppressing type two-link rotary nozzle 2001 modified in the structure of the joint, the injection force of the water from each injection port varies depending on the relative position of the links. Therefore, as compared with the first embodiment, the degree of freedom to the behavior of the nozzle is increased, and it is more likely to transform into chaotic state.

As explained herein, according to the embodiment, using the nozzle with multiple links, by partly suppressing the water stream flowing in the nozzle or in the joint area, the gush of the water coming out of the injection port can be varied depending on the relative position of the links. It means that the degree of freedom of the entire nozzle drive device can be increased, so that the nozzle behavior may be easily set in chaotic state. The nozzle in chaotic state is unstable in trajectory, and never passes the same trajectory again. Therefore, the water can be sprinkled uniformly.

Combining with the method disclosed in the first embodiment, it is also possible to set the nozzle in an appropriate chaotic state by investigating the chaos feature amount such as Lyapunov exponent, varying the design of the joint, or changing the injection direction of water from the injection port, or the position of center of gravity of the link. In this case, since the feature amount such as Lyapunov exponent is detected, the degree of chaos can be properly set, which brings about a further effect in cleaning speed or the like.

Figure 12:
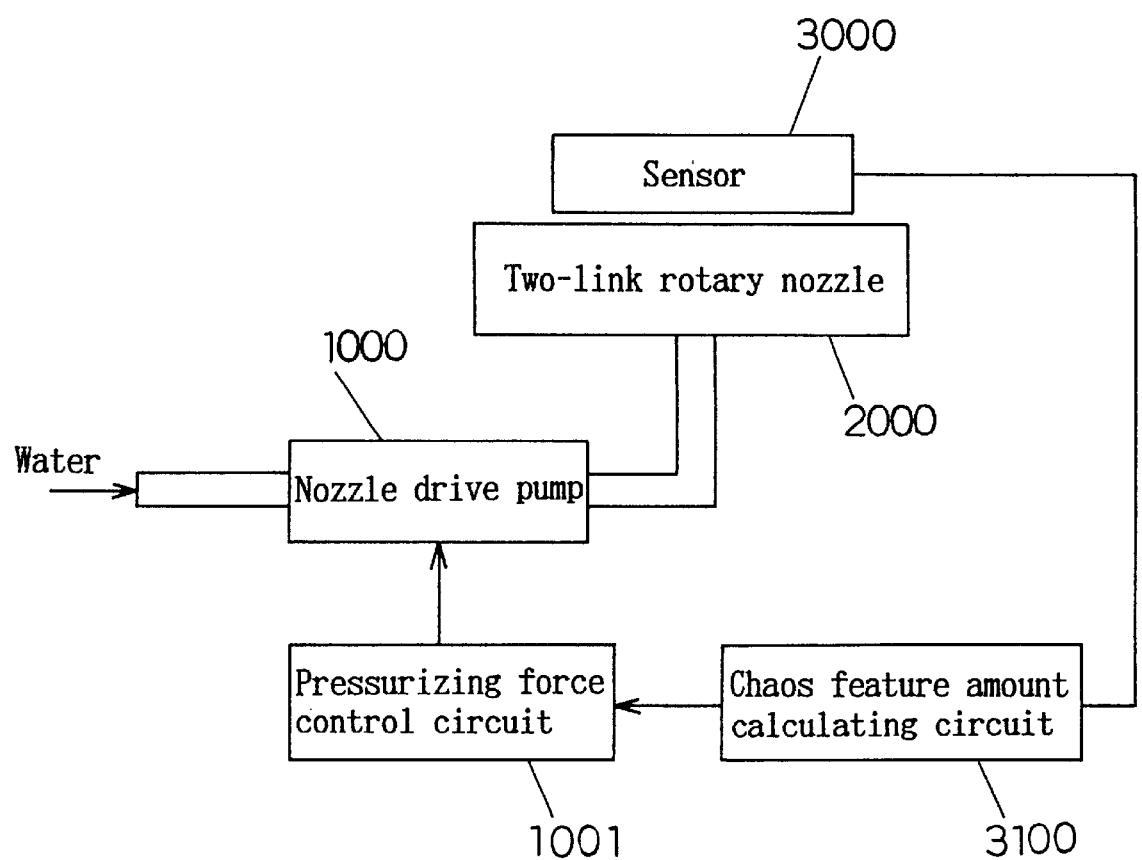
FIG. 12 is a diagram showing a constitution of a rotary nozzle apparatus in a fourth embodiment.

FIG. 12 is a structural diagram of a rotary nozzle apparatus in a fourth embodiment of the invention. Reference numeral 1000 is a nozzle drive pump for pressurizing supplied water, 2000 is a two-link rotary nozzle which is rotated by the force of water pressurized by the nozzle drive pump 1000 to inject water, and 1001 is a pressurizing force control circuit for controlling the pressurizing amount of the nozzle drive pump, and these are similar to the constitution of the third embodiment.

What differs from the third embodiment is the provision of a sensor 3000 for detecting the motion of the two-link rotary nozzle, and chaos feature amount calculating circuit for calculating the feature amount of chaos from the observation about the motion of the nozzle detected by the sensor 3000. In thus constituted rotary nozzle apparatus, the operation is described below.

The first to third embodiments relate to the nozzle drive device which operates in chaotic state. In a dish washer, for example, uniform injection of water is demanded, and it is desired to operate the nozzle always in chaotic state.

If, however, the nozzle is disturbed by dust etc., and the dynamic characteristic of the system varies, the chaotic state may not be always maintained in the methods explained in the first to third embodiments. To avoid such case, in this embodiment, the nozzle motion is detected in real time, and an apparatus capable of driving always in stable chaotic state is presented.

The sensor 3000 detects the nozzle motion, and plural angle sensors as shown in FIG. 3 may be used, or an image processing technology such as video camera may be applied. In this case, the angle sensor in FIG. 3 is used.

The angle of each link detected by the sensor 3000 is entered into a chaos feature amount calculating circuit 3100, and the largest Lyapunov exponent which is one of the chaos feature amounts explained in the first embodiment is calculated. The calculating method of the largest Lyapunov exponent in the chaos feature amount calculating circuit 31 may be either the method mentioned in the first embodiment or other method proposed at academic society.

When the largest Lyapunov exponent is a positive value, it means the nozzle is in chaotic state, and when it is 0, it is in periodic or quasi-periodic state.

Therefore, the chaos feature amount calculating circuit 3100 sends a command, depending on the calculated largest Lyapunov exponent, to the pressurizing force control circuit 1001 for varying the pressurizing pattern if the largest Lyapunov exponent is near 0 or negative, or sends a signal to the pressurizing force control circuit 1001 to continue present pressurizing pattern if the largest Lyapunov exponent is a positive value not close to 0.

The pressurizing force control circuit 1001 varies the pressurizing pattern according to the signal of the chaos feature amount calculating circuit 3100. The method of change is to vary the ON time Ton or OFF time Toff in FIG. 7 (*a*) when pressurized in the pattern as shown in FIG. 7 (*a*), or to vary the period of the sine curve when pressurized in the pattern as shown in FIG. 8 (*b*).

As explained herein, according to the embodiment, by observing the nozzle motion by the sensor and calculating the chaos feature amount from the result of observation, the nozzle driving state can be known. Furthermore, by using this information in control of pressurizing force, the nozzle can be driven always in optimum chaotic state. The nozzle in chaotic state is unstable in behavior, and does not pass the same trajectory again. Therefore, by keeping always in chaotic state, uniform sprinkling of water is realized.

In the invention, since the sensor 3000 is added, non-chaotic state, that is, periodic or quasi-periodic state can be also detected. Therefore, not only to keep in chaotic state, it is also possible to change over chaotic state and periodic state depending on the purpose of use of the nozzle or the situation of use. In this embodiment, the chaos feature amount calculating circuit 3100 calculates the largest Lyapunov exponent, but the same effects are obtained by using other chaos feature amounts such as correlation dimension, capacity dimension, information dimension, other fractal dimension, and Lyapunov dimension.

Figure 13:
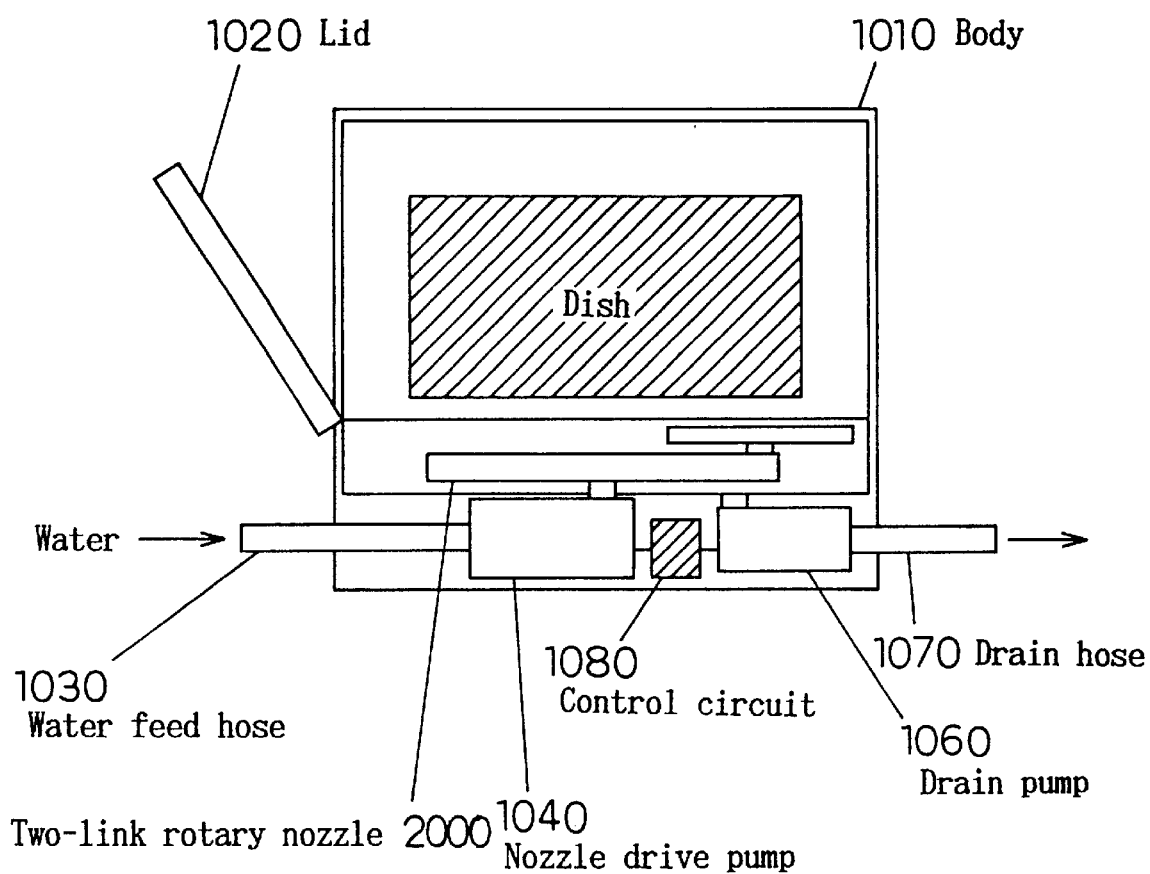
FIG. 13 is a diagram showing a constitution of a dish washer as a fifth embodiment.
Figure 14:
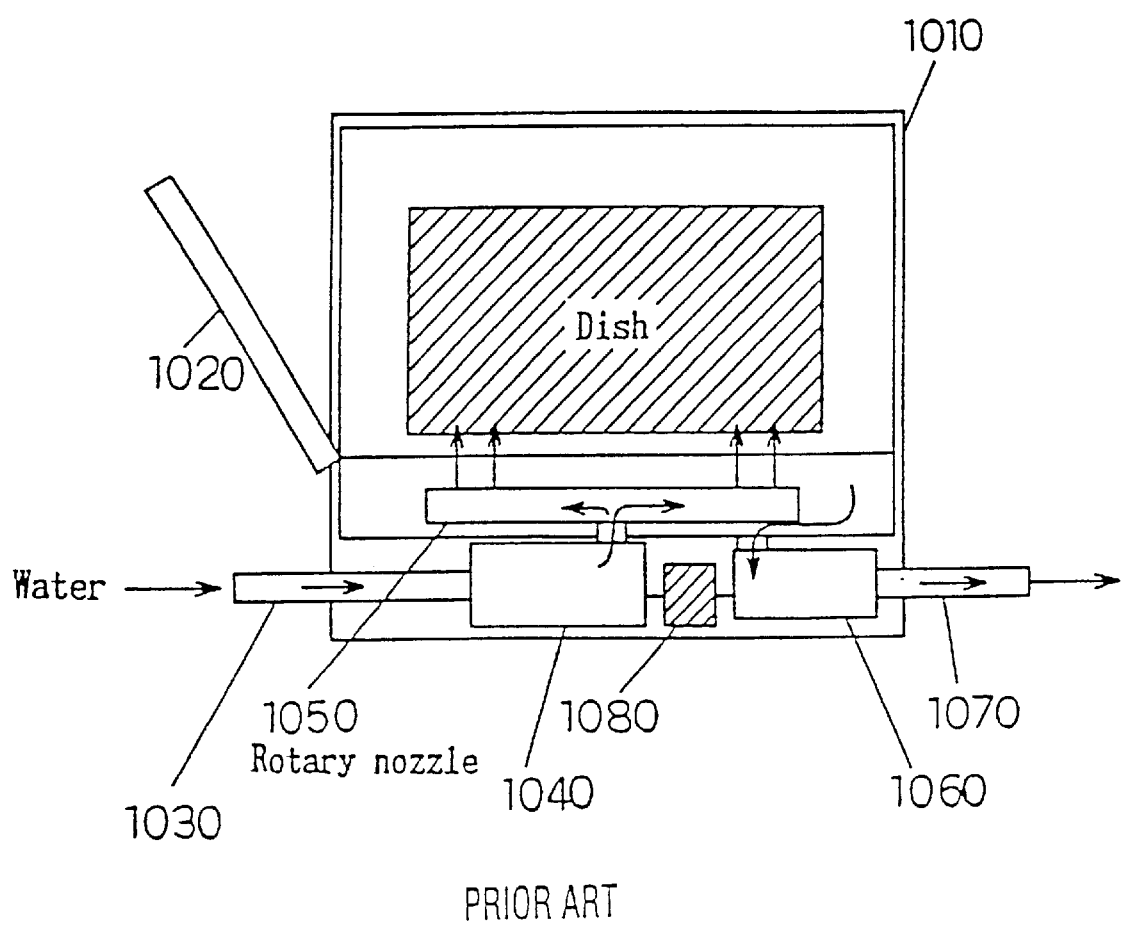
FIG. 14 is a diagram showing a constitution of a conventional dish washer.

As a fifth embodiment of the invention, a dish washer is explained. FIG. 13 shows the structure of a dish washer in this embodiment, in which reference numeral 1010 is a body of a dish washer, 1020 is a lid, 1030 is a water feed hose for taking water into the dish washer, 1040 is a nozzle drive pump for pressurizing the water from the feed water hose 1030 to rotate the nozzle and inject water, 1060 is a drain pump for discharging the water applied on dishes, 1070 is a drain hose for leading the wastewater to the outside of the dish washer, and 1080 is a control circuit for controlling the nozzle drive pump 1040 and drain pump 1060. So far, these are common to the parts in the prior art in FIG. 14. What differs from the prior art is that the two-link rotary nozzle 2000 explained in the first embodiment is used instead of the one-link rotary nozzle.

As explained in the first embodiment, the two-link rotary nozzle can be set in chaotic state. By using the two-link rotary nozzle 2000 in chaotic state, the nozzle moves in the trajectory shown in FIG. 4, and the water is injected to the dishes in more varied directions than the motion trajectories of the prior art in FIG. 2, so that the water can be sprinkled uniformly.

Therefore, in the dish washer using two-link rotary nozzle, as compared with the prior art, water can be injected into every nook and cranny of the dishes, and the stains of dishes can be removed sufficiently. Besides, in the prior art, the nozzle trajectory was a specific circumference, and to remove the stains, the manner of placing dishes must be sufficiently considered, but in this embodiment, since the nozzle trajectory is always changing, a sufficient washing effect is obtained without particularly considering the dish placing manner.

As described herein, by using the rotary nozzle composed of plural links in chaotic state, water can be injected to the dishes more uniformly than in the prior art, and the washing efficiency of the dish washer can be enhanced. In the embodiment, meanwhile, the two-link rotary nozzle explained in the first embodiment is applied in the dish washer, but the rotary nozzle apparatus described in the second to fourth embodiments may be also used. The rotary nozzle apparatus is applied in the dish washer in this embodiment, but it may be also applied in other washers for washing automobiles, semiconductor devices, and other objects, not limited to the dishes, and a similar enhancement of washing efficiency is expected. It can be also applied in the sprinkler, spraying machine, and other sprinkling machine for sprinkling liquid uniformly.

Figure 17:
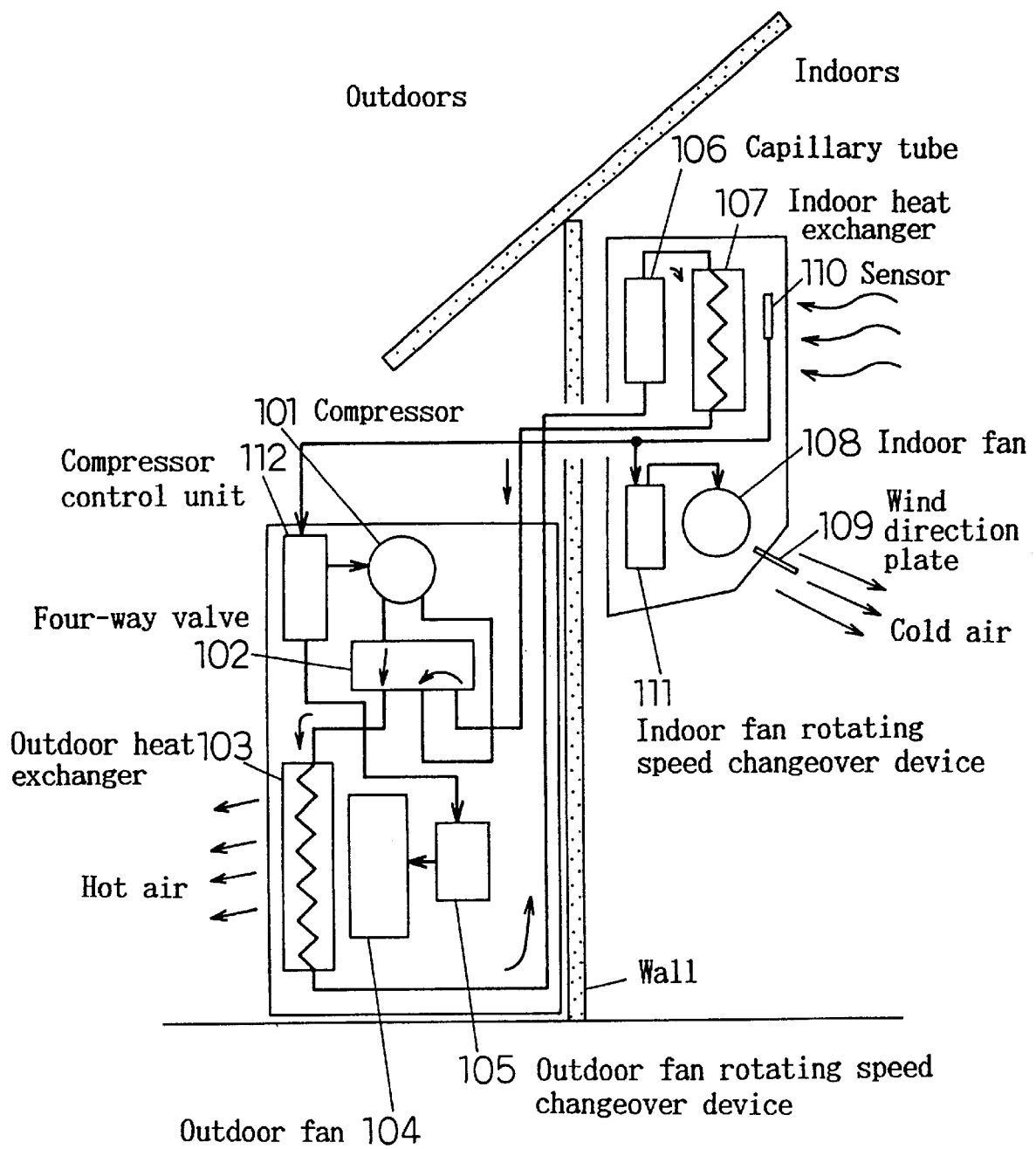
FIG. 17 is a diagram showing a constitution of a prior art of air-conditioner.

As a chaos applied equipment, an example of applying the chaos technology into an air-conditioning equipment is described below. A structure of a conventional air-conditioner is shown in FIG. 17. FIG. 17 shows the cooling operation of the air-conditioner. In FIG. 17, reference numeral 101 denotes a compressor for compressing a refrigerant such as CFC, 102 is a four-way valve for changing over the refrigerant flowing direction depending on whether the operation is cooling or heating, 103 is an outdoor heat exchanger for exchanging the heat of the refrigerant with the heat of the ambient air (to release the heat of the refrigerant when cooling, and absorb the external heat when heating), 104 is an outdoor fan for exchanging heat efficiently in the outdoor heat exchanger 103, 105 is an outdoor fan rotating speed changeover device for changing over the rotating speed of the outdoor fan depending on the operating state of the air-conditioner, 106 is a capillary tube composed of a fine copper pipe for applying a resistance and lowering the refrigerant pressure by passing the refrigerant of high pressure coming from the outdoor heat exchanger 103 through a narrow passage, 107 is an indoor heat exchanger for exchanging the heat of the refrigerant with the heat of the room air, 108 is an indoor fan for blowing cold air (in the case of cooling) into the room, 109 is a wind direction plate for adjusting the direction of the wind produced by the indoor fan 108, 110 is a sensor for detecting the room temperature or humidity, 111 an indoor fan rotating speed changeover device for changing over the rotating speed of the indoor fan 108 depending on the output signal of the sensor 110, and 112 is a compressor control device for controlling the compressor 101 depending on the output of the sensor 110. In the diagram, the thick line indicates the pipe which is insulated in order to circulate the refrigerant in.

In thus constituted air-conditioner, the cooling operation is effected in the following procedure.

1. The refrigerant is compressed by the compressor 101, and the refrigerant is set in the state of high temperature and high pressure.

2. The refrigerant at high temperature and high pressure passes through the four-way valve 102, and is led into the outdoor heat exchanger 103. In the outdoor heat exchanger 103, the refrigerant is cooled nearly to the ambient temperature, and the refrigerant is liquefied.

3. Consequently, the cooled liquid refrigerant at high pressure passes through the capillary tube 106, and the pressure of the refrigerant is lowered.

4. The refrigerant lowed in pressure is evaporated in the indoor heat exchanger 107. The refrigerant deprives of heat of vaporization when evaporated, and hence the air in the indoor heat exchanger 107 and its vicinity is cooled below the dew point.

5. The cooled air is blown out from the indoor fan 108, circulates in the room, and lowers the entire temperature of the room.

6. The refrigerant vaporized in the indoor heat exchanger 107 passes through the four-way valve 102, and is led into the compressor 101, thereby returning to step 1.

In this procedure, the cooling operation is realized. The heating operation is realized by varying the refrigerant flowing direction by the four-way valve 102.

The compressor 101 and indoor fan 108 are controlled depending on the room temperature and other conditions detected by the sensor 110. More specifically, the compressor control device 112 and indoor fan rotating speed changeover device 111 take in the output signal of the sensor 110, and respectively control the output of the compressor 101 and rotating speed of the indoor fan 108. As the indoor fan 108, a cylindrical fan is widely employed, and it is controlled stepwise so as to produce a strong wind when a room temperature over a specified value is detected by the sensor 110, and a weak wind when less than the specified value.

However, only by stepwise change of the output of the indoor fan 108, when the room temperature is set in a certain range, the circulation route of the air stream in the room becomes constant, and a certain specific convection is formed. Therefore, in the room, cold wind (in the case of cooling) is applied to some spots, but not applied to other spots, and uneven temperature distribution of cooled points and uncooled points occurs. This embodiment is intended to solve such problem.

Figure 18:
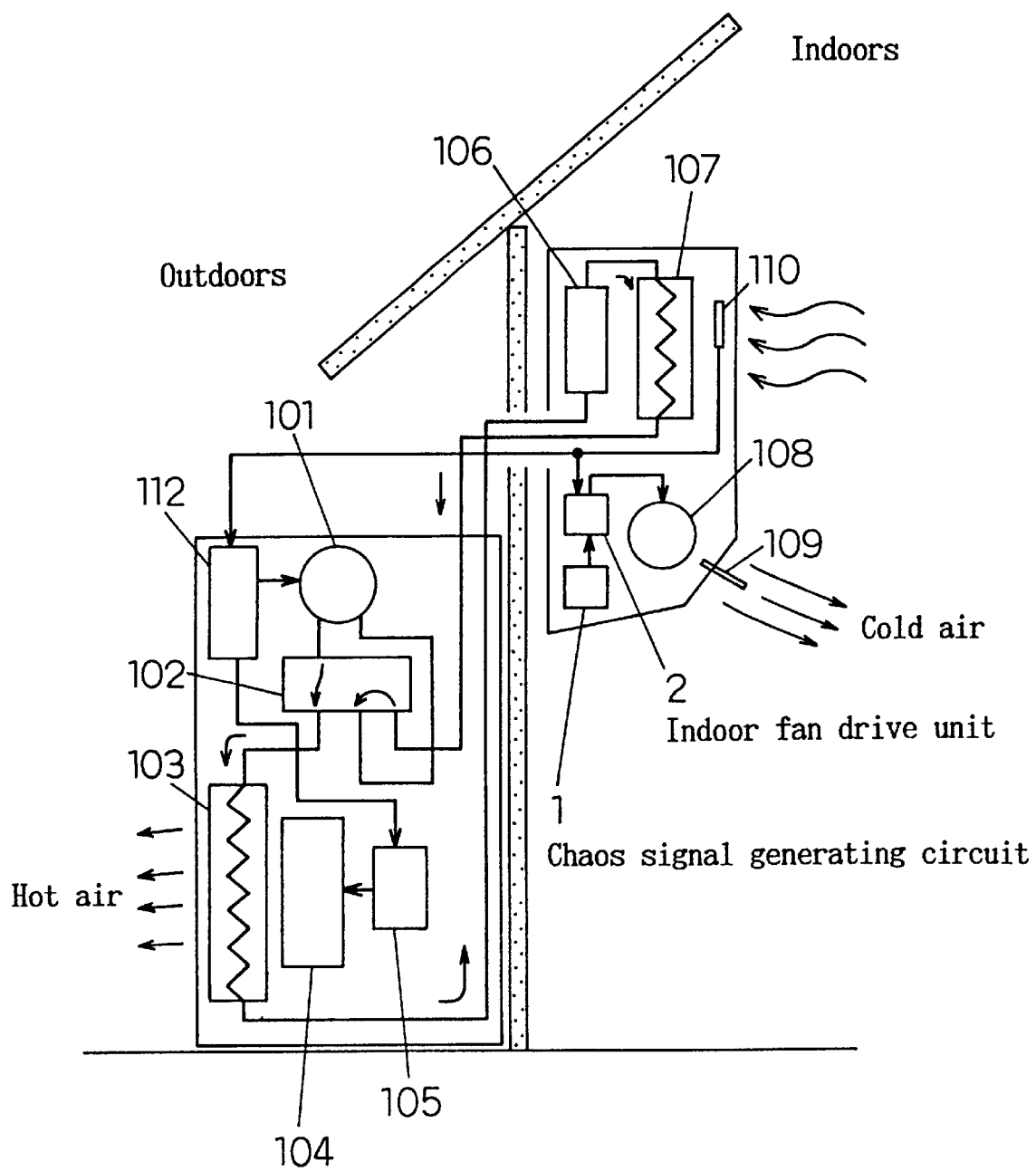
FIG. 18 is a diagram showing a constitution of an air-conditioner in a sixth embodiment.

FIG. 18 shows a sixth embodiment of the invention, specifically showing the constitution of the air-conditioner.

FIG. 18 shows the cooling operation of the air-conditioner, in which reference numeral 101 denotes a compressor, 102 is a four-way valve, 103 is an outdoor heat exchanger, 104 is an on outdoor fan, 103 is an outdoor fan rotating speed changeover device, 106 is a capillary tube, 107 is an indoor heat exchanger, 108 is an indoor fan, 109 is a wind direction plate, 110 is a sensor for detecting the temperature and humidity in the room, and 112 is a compressor control device, and these are same as in the constitution of the prior art.

What differs from the prior art is the provision of the chaos signal generating circuit 1 for generating a chaos signal, and the indoor fan drive device 2 for controlling the driving state of the indoor fan 108 depending on the output signal of the chaos signal generating circuit 1 and the output signal of the sensor 110.

The chaos signal is a complicated signal dominated by a relatively simple rule. It, however, possesses a feature that is different from a mere random signal. (See Nagashima, Baba: Introduction to Chaos—Analysis and Mathematic Principle of Phenomenon, Baifukan.)

Figure 19:
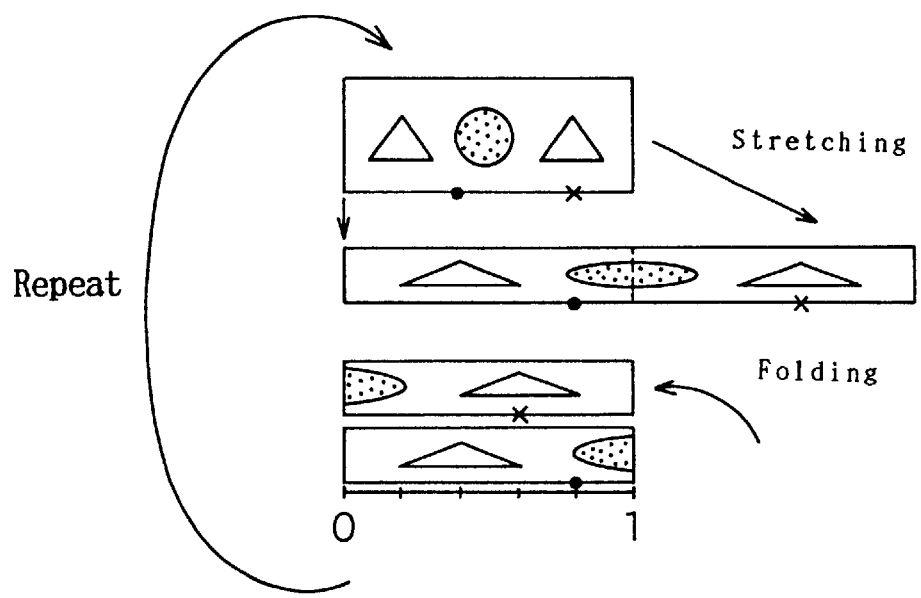
FIG. 19 is an explanatory diagram of pie kneading conversion.

As the principle of a system for generating a chaos signal, so-called pie-kneading conversion (baker's transformation )is known. The pie-kneading conversion is a conversion by repeating stretching and folding as shown in FIG. 19. In FIG. 19, a pie dough is stretchd, and folded down in two. By repeating this conversion of stretching and foloding several times, the ingredients of pie dough are mixed well, and a uniform texture of pie dough is obtained.

The pie kneading conversion is excellent in the capability of making the object uniform, in particular. For example, for a pie dough of 1 cm in thickness, when pie kneading conversion is applied ten times, a pie dough in a thickness of about 10 microns is plaited in 1024 layers, and when the conversion is repeated 20 times, the layer of the dough is thinned to a thickness of molecular level, and the number of layers exceeds 1,000,000. Thus it is known that the pie kneading conversion is capable of making the object sufficiently uniform.

As a typical example of function for generating a chaos signal, a conversion known as Bernoulli shift expressed below is known.

$$x(n+1) = \begin{cases} 2x(n) & 0 < x(n) \leq 0.5 \\ 2x(n) - 1 & 0.5 < x(n) \leq 1 \end{cases} \quad (5)$$

Figure 20:
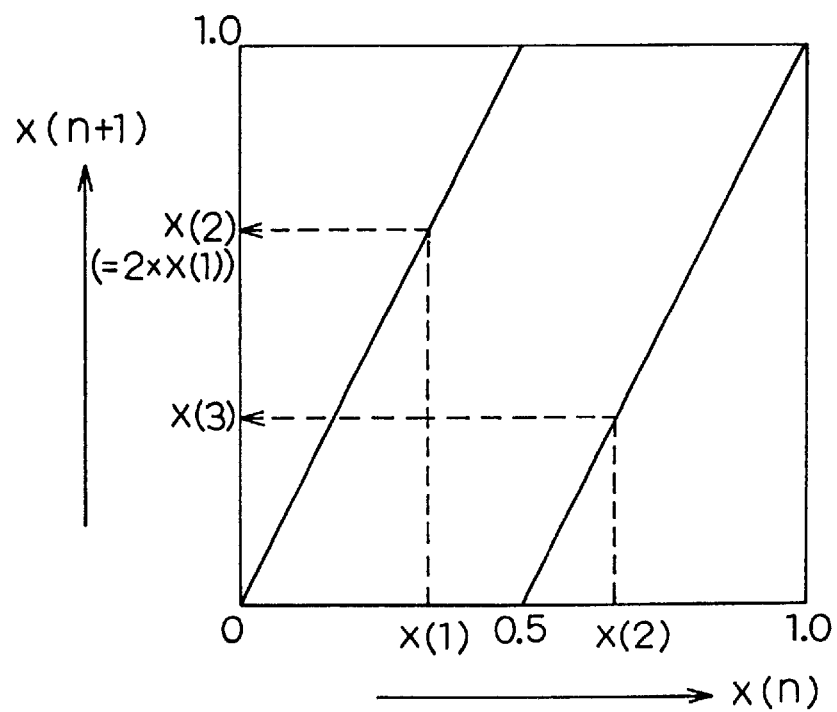
FIG. 20 is an explanatory diagram of Bernoulli shift.
Figure 21:
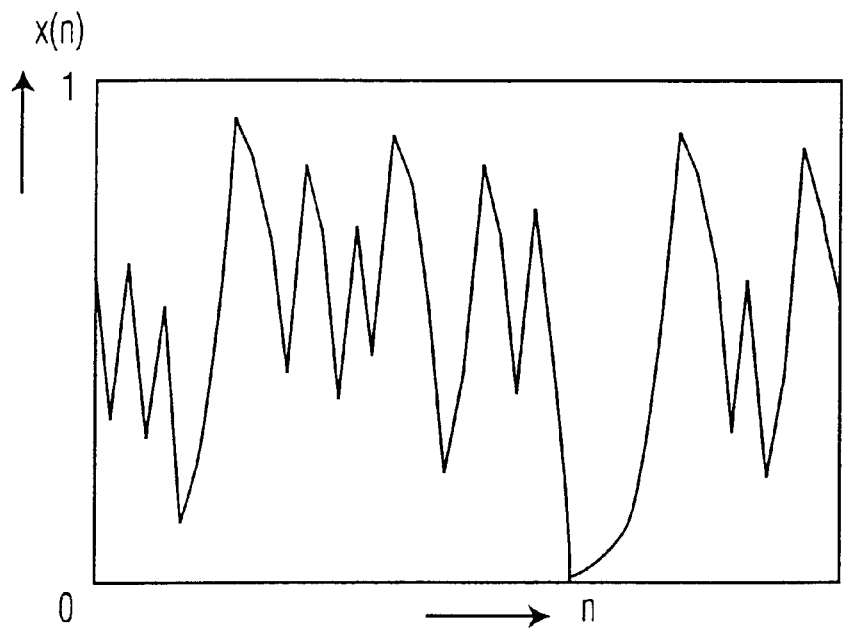
FIG. 21 shows time series data generated by Bernoulli shift.

From formula (5), the relation of x(n) and x(n+1) of Bernoulli shift may be expressed as shown in FIG. 20. The time series data generated from the Bernoulli shift calculated from formula (5) may be illustrated as shown in FIG. 21. Although the time series data is calculated by a very simple numerical expression as shown in formula (5), it appears to present an irregular behavior.

It is known there is a relation between Bernoulli shift and pie kneading conversion. The data x(n) belonging to the region of 0<x(n)≦0.5 on the axis of abscissas in FIG. 20 is magnified (two times) by the Bernoulli shift, and is mapped into x(n+1) in 0<x(n+1)≦1.0. It is the same in the portion of 0.5<x(n)≦1.0. This conversion corresponds to the stretching of the pie kneading conversion. Besides, as clear from the diagram, the data of 0<x(n)≦0.5 and 0<x(n)≦1.0 are once magnified, and respectively mapped copied into the same region of 0<x(n)<1.0. This operation means folding of pie kneading operation.

Therefore, it is known that Bernoulli shift is the conversion of stretching and folding of pie kneading conversion.

Hence, the chaos signal that is deduced by repeating the conversion such as Bernoulli shift a number of times possesses the pie kneading conversion as its basic characteristic, and the capability of making the object uniform is known. Incidentally, the function having the pie kneading conversion as the principle is not limited to the Bernoulli shift, but includes various functions including the logistic function and tent mapping This feature of making uniform is related with the basic characteristics of chaos, such as dependence on initial value, instability of trajectory, and consistency. (See T. S. Parker, L. O. Chua: Practical Numerical Algorithm for Chaotic System, Springger-Verlag, 1989.) These properties are mutually related, but in particular the instability of trajectory is important. It means that the system incessantly changes the state unstably, never repeating the same state change again, and the output behaves to fill up the output space or the state space densely.

By rotating the indoor fan 108 of the air-conditioner according to such chaos signal, the indoor fan is set in various operating state, never repeating the same state series. Hence, the indoor air can be agitated sufficiently.

In the conventional air-conditioner, the output of the indoor fan 108 only changes stepwise in proportion to the temperature detected by the sensor 110. Therefore, when the room temperature comes in a certain range, the circulation route of air stream in the room becomes constant, and cold air (in the case of cooling) is applied to some points and not applied in other points in the room, and uneven temperature of cooled place and uncooled place occurs. In the embodiment, having such constitution, the circulation route of the air stream can be always changed, and as compared with the conventional indoor fan for controlling stepwise, the temperature distribution in the room can be made more uniform.

Figure 22:
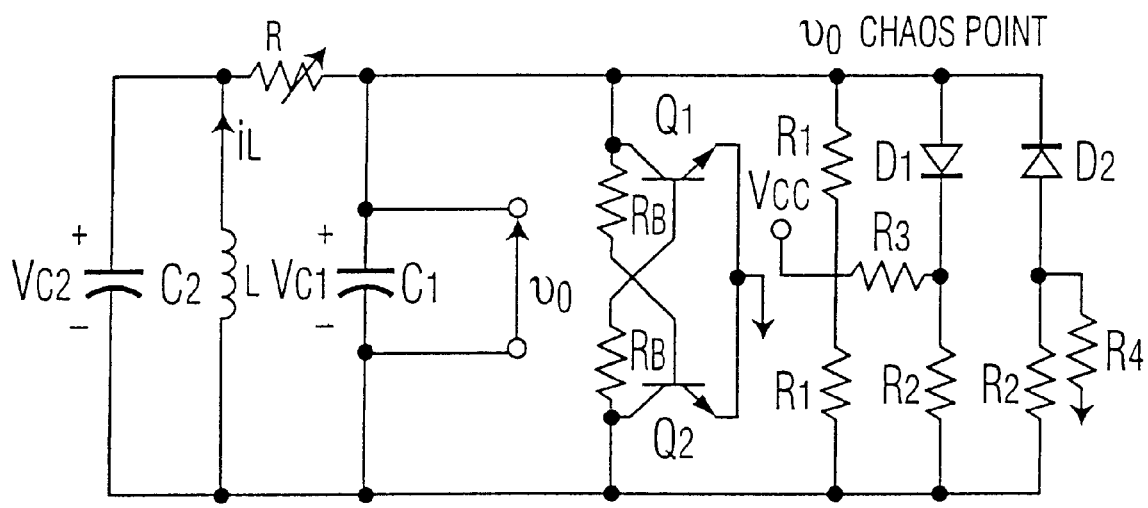
FIG. 22 is a diagram showing an electric circuit for generating a chaos signal.
Figure 23:
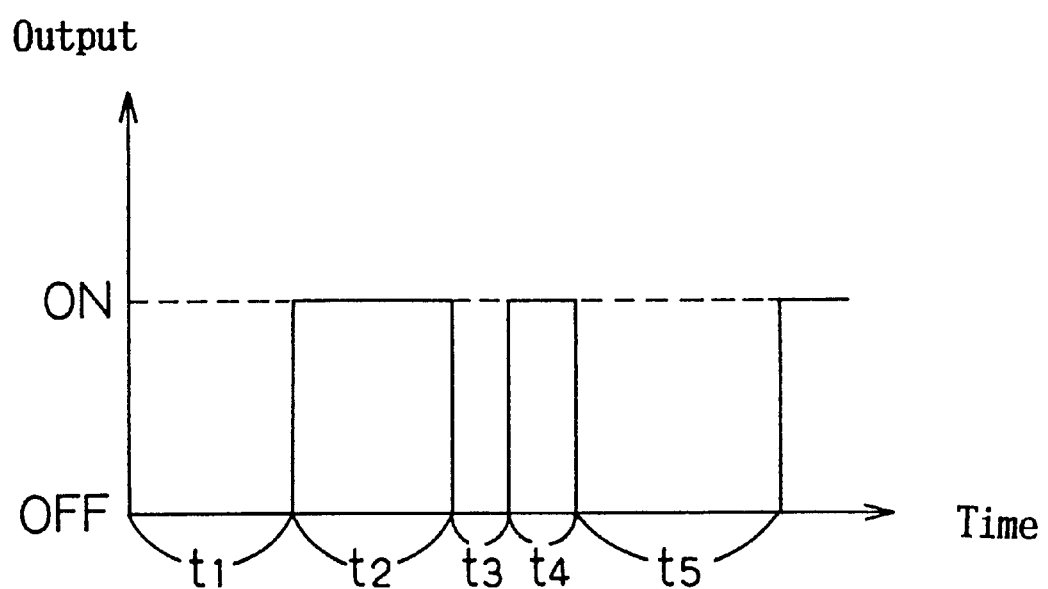
FIG. 23 is a diagram showing a chaotic on/off signal.
Figure 40:
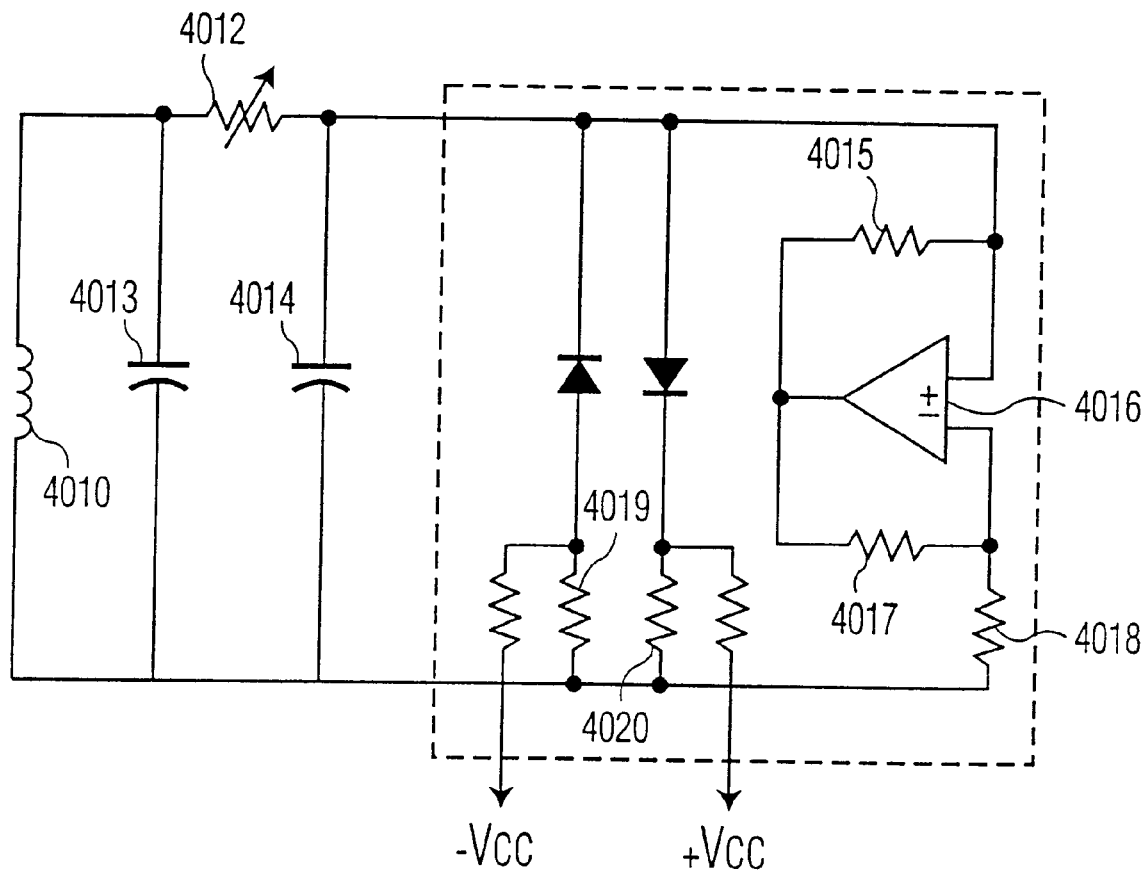
FIG. 40 is a diagram showing an equivalent circuit to the circuit shown in FIG. 22 for generating a chaos signal.

The chaos signal generating circuit 1 in FIG. 18 is composed of an electric circuit for generating a chaos signal. In a specific constitution, for example, formula (5) may be calculated by microcomputer to produce a signal, or an electric circuit in FIG. 22 as mentioned in Chapter 2 of the publication "Chaos — Foundation and Application of Chaos—" (ed. by Kazuyuki Aihara, Science Co.). The signal generated from the chaos signal generating circuit 1 may be an on/off signal as shown in FIG. 23, a signal as time series signal with pulse intervals t1, t2, . . . as chaos, or a signal by intermittent chaos. The publication referenced above discloses the following:

The electric circuit shown in FIG. 22 generates a chaotic signal across capacitor $C_1$. The electric circuit shown in FIG. 22 includes discrete transistors. An equivalent circuit is shown in FIG. 40 that uses an operational amplifier instead of discrete transistors. The values of the various components in the circuit of FIG. 40 is given in the following table:

TABLE 1

Value of Elements in the Circuit shown in FIG. 40.

| Element | Value |
| --- | --- |
| 4010 | 8.2 mH |
| 4012 | 1.33 k ohms (variable) |

TABLE 1-continued

Value of Elements in the Circuit shown in FIG. 40.

| Element | Value |
| --- | --- |
| 4013 | 0.05 uF |
| 4014 | 0.0055 uF |
| 4015 | 300 ohms |
| 4016 | UA741C |
| 4017 | 300 ohms |
| 4018 | 1.25 k ohms |
| 4019 | 3.3 k ohms |
| 4020 | 3.3 k ohms |

Without assembling the circuit, the operation of the circuit may be simulated by using a personal computer. This circuit may be expressed in the following differential equation:

$$C_1 \frac{dv_{c1}}{dt} = G(v_{c2} - v_{c1}) - g(v_{c1})$$

$$C_2 \frac{dv_{c2}}{dt} = G(v_{c1} - v_{c2}) + i_L$$

$$L \frac{di_L}{dt} = -v_{c1}$$

Where: $v_{c1}$, $c_{c2}$, $i_L$ are a voltage across C1, a voltage across C2, and a current of L, respectively,
G is the conductance of variable resistance R (G=1/R), and $g(v_{c1})$ is the characteristic of a partial circuit N, which is expressed in the following formula.

$$g(v_{c1}) = m_o v_{c1} + \frac{1}{2}(m_1 - m_0)|v_{c1} + B_p| + \frac{1}{2}(m_0 - m_1)|v_{c1} - B_p|$$

This differential equation may be displayed on the CRT by calculating the solution curve about a proper initial value (for example, $v_{c1}=v_{c2}=i_L=0.001$) by employing the Runge-Kutta method. Parameter values are as follows:

$$\frac{1}{C_1} = 9, \frac{1}{C_2} = 1, \frac{1}{L} = 7, G = \frac{1}{R} = 0.1 \sim 1.5,$$

$$m_0 = -0.5, m_1 = -0.8, B_p = 1$$

Of course, the values may be properly converted in scale.

One may take the voltage at both ends of $C_1$ of this circuit and connect it to a speaker. By changing G, a beep sound is heard at one place and a bleah sound is heard at another place. To observe more closely, one may input the voltage across $C_1$ and the voltage across $C_2$ into an oscilloscope, and observe Lissajous figures. First, the value of G is sufficiently small, and the value is increased gradually to observe the changes.

Figure 41A:
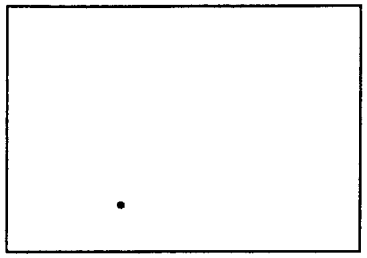
FIGS. 41($a$) –($o$) are illustrations showing various Lissajous patterns displayed on an oscilloscope.

When the value of G is small, no sound is heard from the speaker, and only a raster as shown in FIG. 41(a) is observed on the oscilloscope. This is a stable balance point, and called a balance point attractor.

Figure 41B:
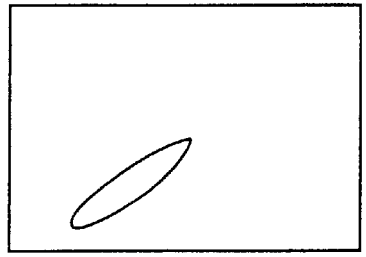

As the value of G is gradually increased, suddenly a beep sound is heard, and a circumference as shown in FIG. 41(b) appears on the oscilloscope. This is a stable periodic solution, and called a periodic attractor. Thus, as the parameter changes, the point attractor is changed to the periodic attractor, and such phenomenon is called Hopf bifurcation of balance point.

Figure 41C:
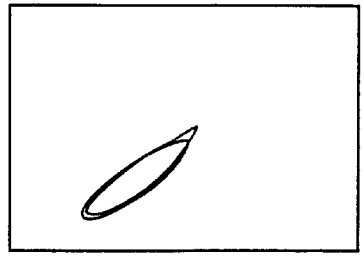
Figure 41D:
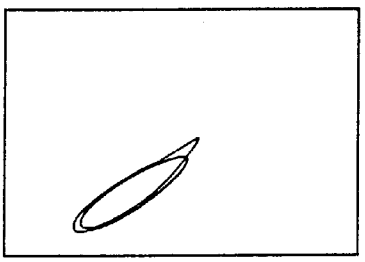
Figure 41E:
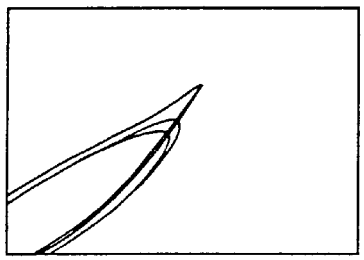

As the value of G is further increased, the sound declines one octave lower, and a two-turn circumference appears in the oscilloscope as shown in FIG. 41(c). It is still a stable periodic solution, and by observing the waveform of $V_{c1}$ by changing the range of the oscilloscope, it is known to have a period of about two times that of FIG. 41(b). When the value of G is increased still more (G=0.645), a four-turn periodic attractor is observed as shown in FIGS. 41(d) & (e). The waveform of $V_{c1}$ at this time has a period of about four times that of FIG. 41b. Such phenomenon of change of the periodic attractor to a periodic attractor having a period of two times is called a periodic multiple bifurcation. Generally, the periodic multiple bifurcation occurs in a row of 2 times, 4 times, 8 times, 16 times, and so forth, and converges on the parameter value corresponding to 2. From the boundary of this value, the system gets into a chaotic state. In an actual circuit, considering the fluctuations of the heat or the like, it may be a limit to allow up to eight periods (G=0.6456).

Figure 41F:
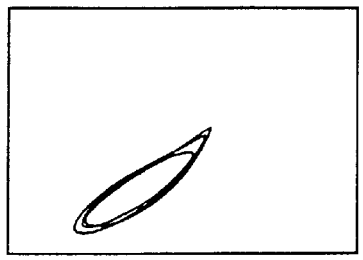

FIG. 41(f) shows a screen of the oscilloscope when getting into a chaotic state. Perhaps "zzz" sound will be heard from the speaker. There are various types of "strange attractor" (SA), and FIG. 41(f) shows a so-called Rossler spiral attractor.

Figure 41G:
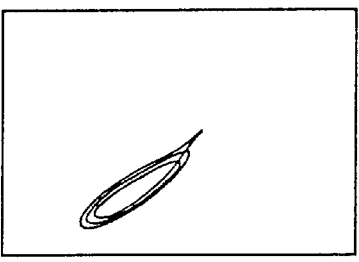
Figure 41H:
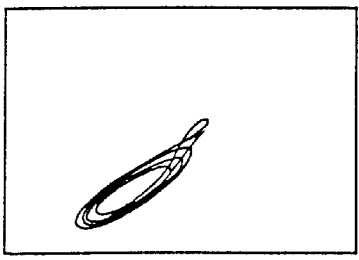

By further increasing the value of G, the spiral attractor continues for some time while changing the thickness. At a certain point, suddenly, the sound changes to a clear beep tone and the screen shows a three-turn periodic attractor (G=0.6525) as shown in FIG. 41(g). This attractor repeats periodic multiple bifurcation of 6 turns and 12 turns, and becomes SA again. By continuing to increase the value of G carefully, a five-turn period attractor is observed (G=0.657338) as shown in FIG. 41(h), and it also becomes SA again after the periodic multiple bifurcation row. Generally, when the parameter is changed, a parameter region including SA and a parameter region including periodic attractor appear alternately. The former is called the chaotic region, and the latter is known as periodic attractor region or window.

Figure 41I:
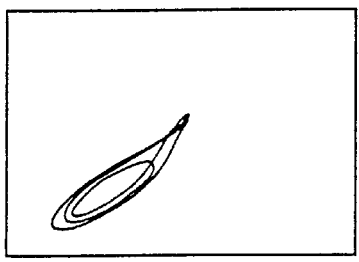
Figure 41J:
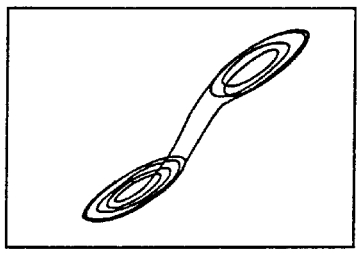
Figure 41K:
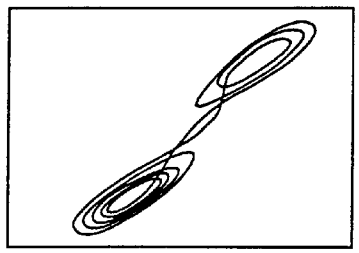
Figure 41L:
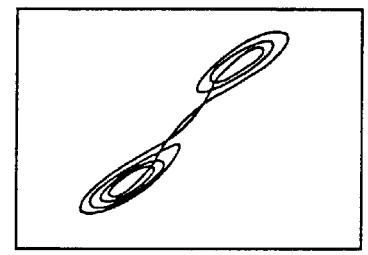
Figure 41M:
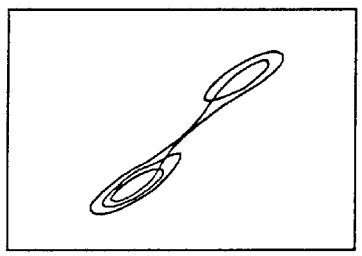
Figure 41N:
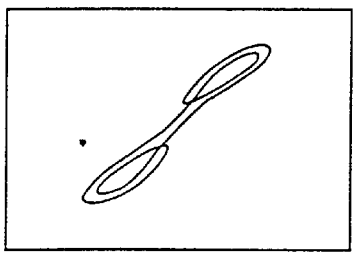
Figure 41O:
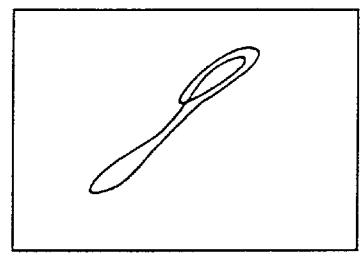

When grown sufficiently in this manner, the attractor becomes as shown in FIG. 41(i), which is known as Rossler screw attractor (G=0.657). From this state, when the value of G is further increased, the screw attractor suddenly becomes a double size attractor as shown in FIG. 41(j). This system is an origin-symmetric system, and there are two screw attractors at symmetrical positions to the origin, and they are grown together and combined into one. This newly developed attractor is called a double-scroll attractor. The phenomenon of development of the double-scroll attractor from the two screw attractors is called "birth of double scroll" and it is also a kind of bifurcation phenomena called interior crisis.

Moreover, by increasing the value of G, periodic attractors of various forms are observed as shown in FIGS. 41(k)–(o). The periodic attractors include both origin-symmetric and asymmetric profiles. It is impossible to form strictly symmetrical circuits, and the circuit elements are not uniform, and exactly the same phenomena as shown may not be always observed, but several kinds of periodic attractor may be discovered.

By increasing the value of G furthermore, SA disappears at a certain point (G=0.8). Mathematically, the solutions diverge to infinity, but in an actual circuit, for example, $V_{c1}$ is not infinite, but settles at a periodic attractor at a region far outside from the observation region known so far. This extinguishing phenomenon of double-scroll attractor is called "death of double scroll" and it is a kind of bifurcation phenomenon called boundary crisis.

These are modes of bifurcation by changing G. In the circuit, it seems difficult to change the parameters other than G stably, but those using the simulation program are advised to change also other parameters.

TABLE 2

Oscilloscope Patterns

| FIG. | Oscilloscope Patterns |
| --- | --- |
| 41a | (1) Balance point attractor |
| 41b | (2) 1 period |
| 41c | (3) 2 periods |
| 41d | (4) 4 periods |
| 41e | (5) Magnified view of 4 periods |
| 41f | (6) Spiral |
| 41g | (7) 3 periods |
| 41h | (8) 5 periods |
| 41I | (9) Screw |
| 41j | (10) Double scroll |
| 41k | (11) Periodic attractor |
| 41l | (12) Periodic attractor |
| 41m | (13) Periodic attractor |
| 41n | (14) Periodic attractor |
| 41o | (15) Periodic attractor |

The publication also provides a solution curve program list for N88 BASIC.

The indoor fan drive device 2 in FIG. 18 is an apparatus for varying the rotating speed of the indoor fan 108 according to the output of the chaos signal generating circuit 1 and the output of the sensor 110, and for example, according to the formula below, the rotating speed of the indoor fan 108 is changed.

Rotating speed of the indoor fan=K1*(target temperature−temperature detected from sensor)+K2*output of chaos signal generating circuit where K1 and K2 are constants. By performing such calculation in the indoor fan drive device 2, the chaos component can be added to the motion of the indoor fan, and the indoor fan can be set in various states of motion. As a result, cold air (or hot air) from the air-conditioner is distributed throughout the room, and the temperature distribution in the room can be set uniform same as in the pie kneading conversion.

Thus, according to the embodiment, by rotating the indoor fan according to the chaos signal, the indoor temperature distribution can be kept uniform, and uniform air-conditioning without uneven temperature is realized. Besides, by making the room temperature uniform, excessive air-conditioning can be avoided, and the power consumption of the entire air-conditioner can be decreased, so that the energy can be saved.

Figure 24:
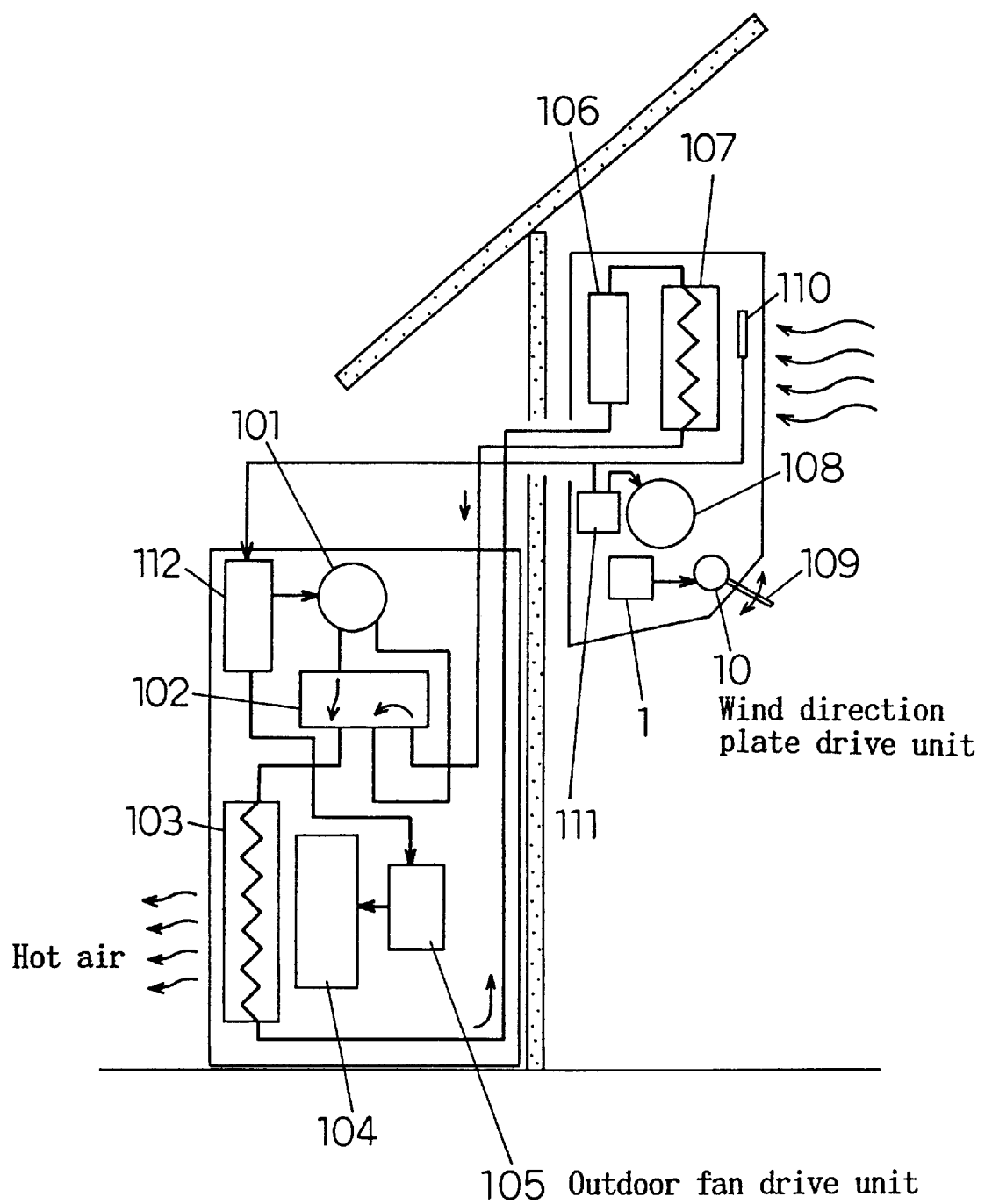
FIG. 24 is a diagram showing a constitution of an air-conditioner for operating a wind direction plate chaotically.

In the embodiment, the rotating speed of the indoor fan 108 is changed by the chaos signal, but by using the wind direction plate drive device 10 as shown in FIG. 24, it may be constituted to move the wind direction plate up and down, and the chaos signal generating circuit 1 may be connected to the wind direction drive device 10 to vary the angle and angular velocity of the wind direction plate 109 by chaos signal, so that the same effects may be obtained. In FIG. 24, there is only the wind direction plate 109 for varying the wind blowing direction in the vertical direction (up and down), but similar effects are obtained by using a wind direction plate for further varying the wind blowing direction in the horizontal direction (right and left) to change the angle or angular velocity of the wind direction plate depending on the output of the chaos signal generating circuit 1.

Figure 25:
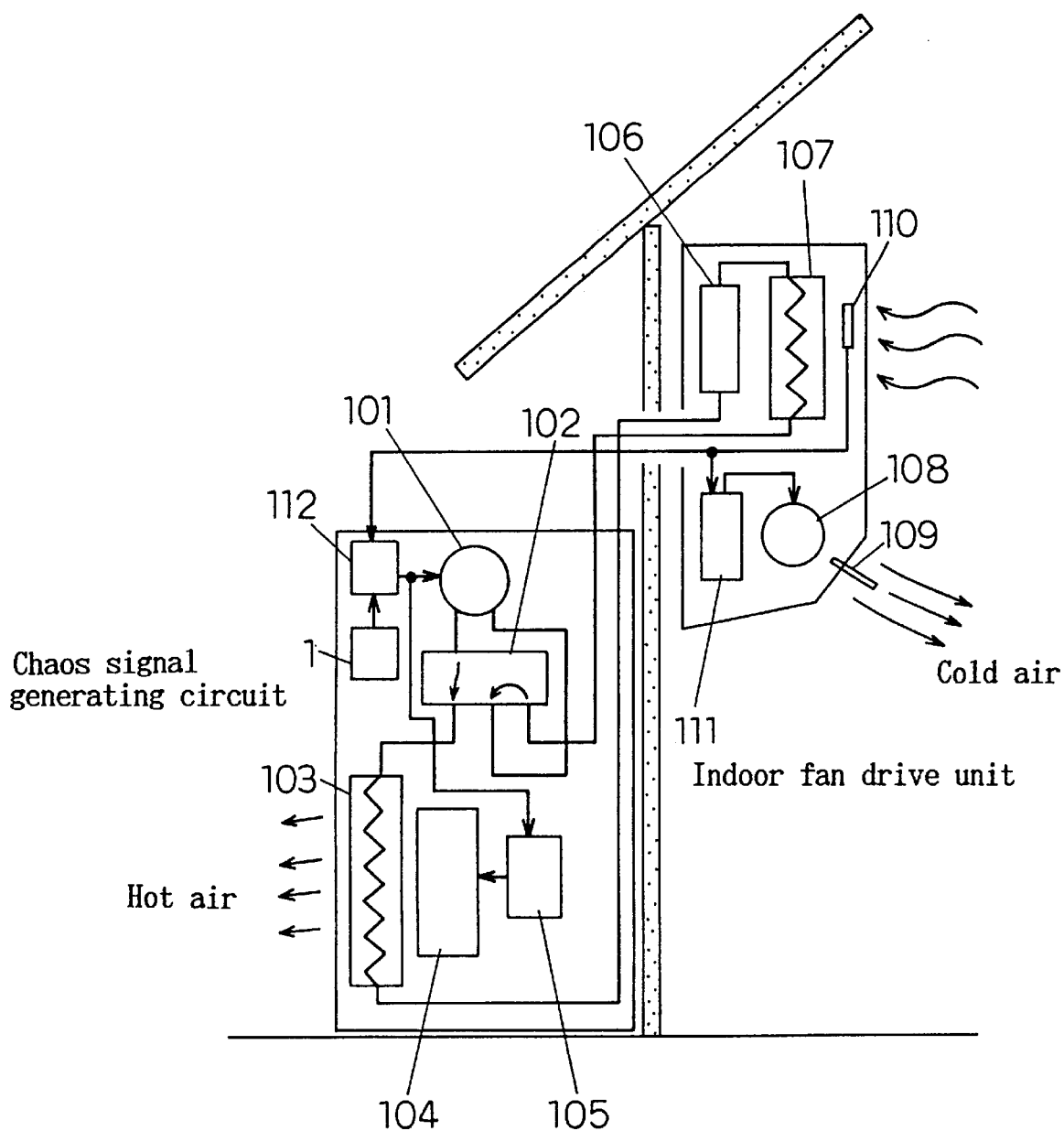
FIG. 25 is a diagram showing a constitution of an air-conditioner for driving a compressor chaotically.

In addition, same effects are obtained by connecting the chaos signal generating circuit 1 to the compressor control device 112 as shown in FIG. 25, and varying the output of the compressor 101 according to the output of the chaos signal generating circuit 1.

The embodiment relates to an example of air-conditioner, but it holds true in other air-conditioning devices such as oil fan heater, ceramic heater, and electric stove, and the room temperature can be set uniform by controlling the indoor fan or wind direction plate according to the chaos signal.

Figure 26:
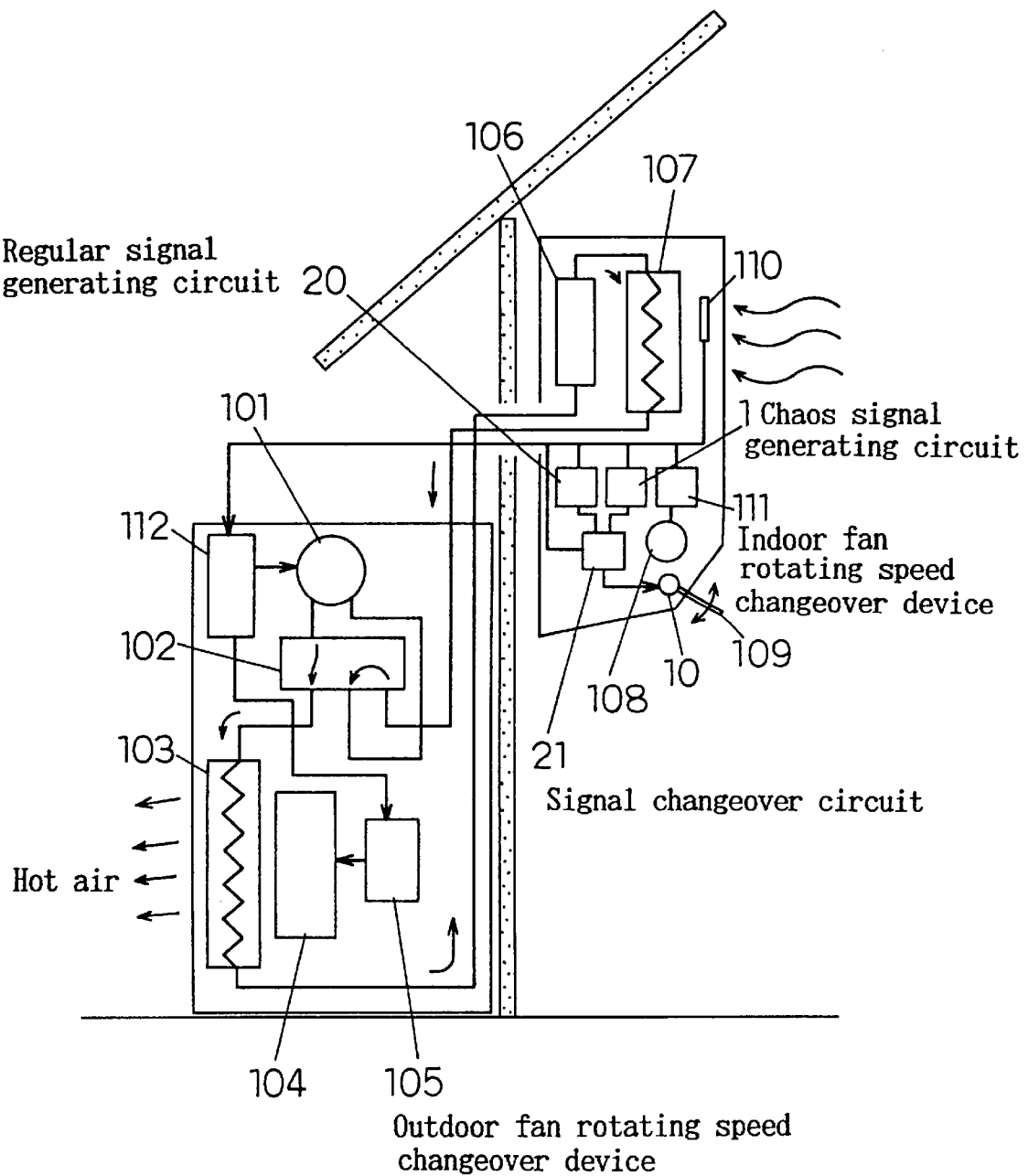
FIG. 26 is a diagram showing a constitution of an air-conditioner as a seventh embodiment.

FIG. 26 is a structural diagram of an air-conditioning equipment in a seventh embodiment of the invention, specifically showing the constitution of an air-conditioner.

FIG. 26 shows the cooling operation of the air-conditioner, in which reference numeral 101 denotes a compressor, 102 is a four-way valve, 103 is an outdoor heat exchanger, 104 is an outdoor fan, 105 is an outdoor fan rotating speed changeover device, 106 is a capillary tube, 107 is an indoor heat exchanger, 108 is an indoor fan, 109 is a wind direction plate, 112 is a compressor control device, 1 is a chaos signal generating circuit, and 111 is an indoor fan rotating speed changeover device, and so far these are same as in the constitution of the sixth embodiment.

What differs from the sixth embodiment is the provision of pyroelectric infrared rays array detector for detecting the temperature distribution in the room as sensor 110', a regular signal generating circuit 20 for generating a regular signal depending on the output of the sensor 110', and a signal changeover circuit 21 for changing over the output of the chaos signal generating circuit 1 and output of the regular signal generating circuit 20.

As mentioned in the sixth embodiment, by driving the indoor fan 108 or wind direction plate 109 according to the chaos signal, the indoor temperature distribution may be made uniform.

In the actual air-conditioner, however, it may be insufficient to control to keep the temperature distribution uniform. For example, when starting up the air-conditioner, when the target temperature and the temperature detected by the sensor are widely apart, it takes time to cool (in the case of cooling) the entire room uniformly, the user may feel more comfortable when the cold air is blown in an occupied position, rather than by starting with uniform air-conditioning in consideration of the entire room.

To cope with such case, in this embodiment, the signal from the chaos signal generating circuit 1 and the signal from the regular signal generating circuit 20 are changed over by the signal changeover circuit 21 and fed into the wind direction plate drive device 10, so that the wind direction plate 109 is controlled by changing over in the chaotic state or regular state. A practical operation of the embodiment is described below.

The sensor 110' is composed of a pyroelectric array detector and its signal processing circuit, and by detecting the indoor temperature distribution, an approximate position of a person present in the room (the higher temperature region), and the average temperature in the room can be detected (Japanese Patent Application No. 4-254302).

The signal changeover circuit 21 selects either the chaos signal or the regular signal according to the average temperature signal produced from the sensor 110' and the target temperature of the air-conditioner. More specifically, the regular signal is selected when the difference between the target temperature of the air-conditioner and the actual temperature detected by the sensor 110' is greater than a specific value, and the chaos signal is selected when the difference is smaller than the specific value.

The regular signal generating circuit 20 produces a signal for moving the wind direction plate 109 regularly up and down, and right and left, around the direction of the higher temperature distribution (in the case of cooling) according to the signal from the sensor 110 in order to aim the wind to the place likely occupied by person. By this signal, spot air-conditioning around the occupied place can be realized.

The chaos signal generating circuit 1 is same as in the sixth embodiment.

In such constitution, if there is any difference between the target temperature and the present temperature as in starting time of the air-conditioner, spot air-conditioning is applied to the region likely to be occupied by person as detected by the sensor 110', and when the average temperature of the room is close to the target temperature, the wind direction plate 109 is driven in chaotic state. Hence, more comfortable air-conditioning is realized.

The wind direction plate 109 in FIG. 26 is for rotating in the vertical (up-down) direction only, but it may be rotated in the horizontal (right-left) direction.

Figure 27:
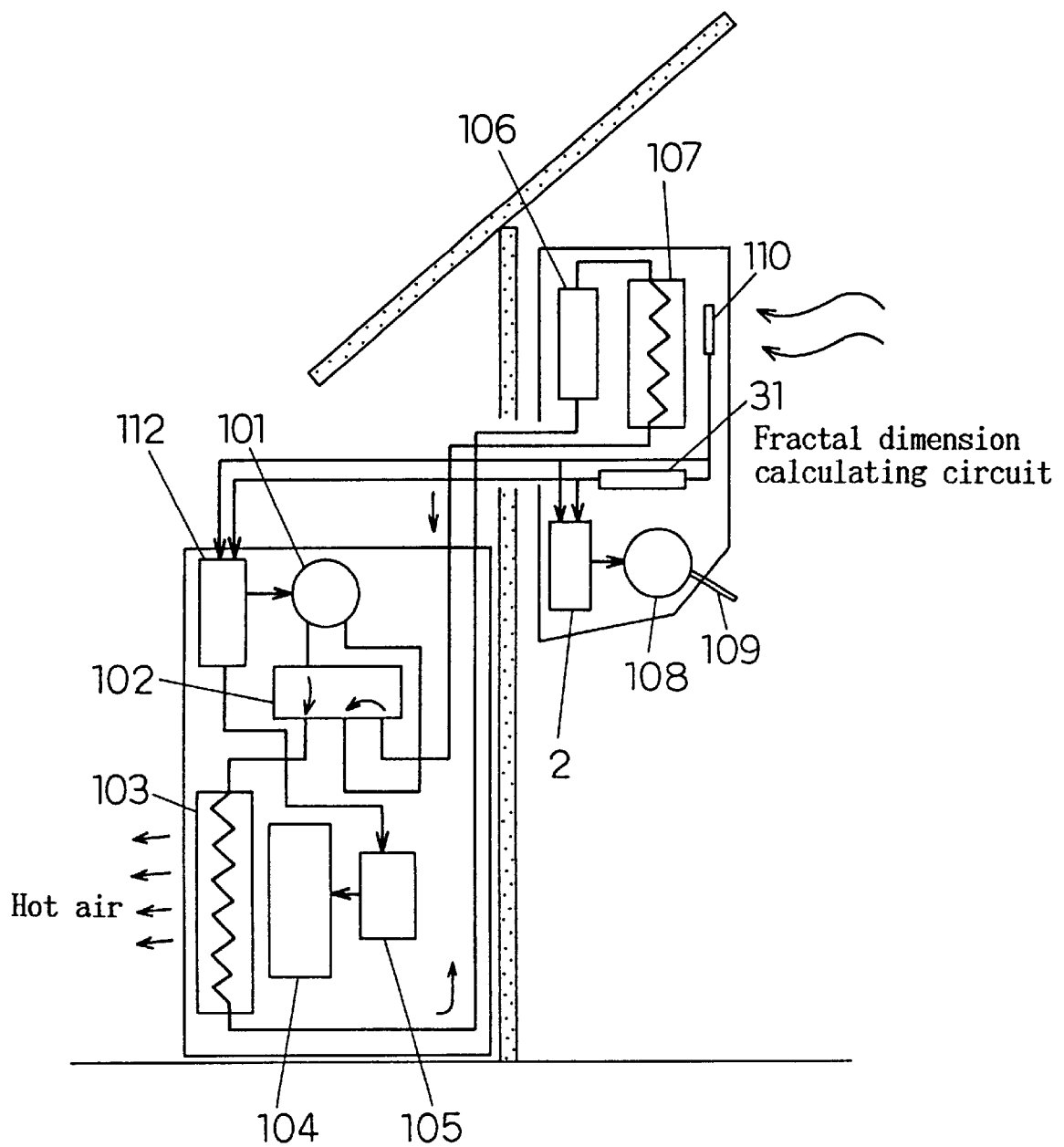
FIG. 27 is a diagram showing a constitution of an air-conditioner as an eighth embodiment.

FIG. 27 is a structural diagram of an air-conditioning equipment in an eighth embodiment of the invention, specifically showing the constitution of an air-conditioner.

FIG. 27 shows the cooling operation of the air-conditioner, in which reference numeral 101 denotes a compressor, 102 is a four-way valve, 103 is an outdoor heat exchanger, 104 is an outdoor fan, 105 is an outdoor fan rotating speed changeover device, 106 is a capillary tube, 107 is an indoor heat exchanger, 108 is an indoor fan, 109 is a wind direction plate, 110 is a sensor for detecting the indoor temperature or humidity, and 112 is a compressor control device, and so far they are same as in the constitution of the prior art.

What differs from the prior art is that a fractal dimension calculating circuit 31 for determining the fractal dimension for the output signal of the sensor 110 is provided.

The fractal dimension is an extended concept of the ordinary dimension, and a non-integer dimension exists. The fractal dimension indicates the self-similarity or complexity of the input time series signal, and when the degree of freedom of the object system is high and the behavior is complicated, the value is large, or in the case of a simple and regular signal, to the contrary, the value is small. It is known, incidentally, that the fractal dimension to the signal in chaotic state is a non-integer.

By thus calculating the fractal dimension to the time series signal produced from the sensor 110, the information about the motion or entry or departure of the people in the room where the air-conditioner is installed can be obtained.

For example, in a room where people always enter or leave irregularly, the value of the fractal dimension to the output signal of the temperature sensor is large, whereas in the room where people enter and leave relatively less and regularly, and the activity of the people is low, the value of the fractal dimension is small.

Therefore, by calculating the fractal dimension relatively to the output signal of the sensor 110, a comprehensive index showing the frequency of people entering or leaving the room where the air-conditioner is installed or changes of the activity of people can be obtained.

As the fractal dimension, hitherto, information dimension, capacity dimension, correlation dimension, and others have been proposed. (See T. S. Parker, L. O. Chua: Practical Numerical Algorithm for Chaotic System, Springer-Verlag, 1989.) In this embodiment, the fractal dimension calculating circuit 31 is explained by referring to correlation dimension.

The correlation dimension was proposed by Gassberger and Procassia in 1983, and is determined by using the correlation integration in the following formula.

$$C(r) = \frac{1}{N*N} \sum_{i,j}^{N} H(r - |X(i) - X(j)|) \quad (6)$$

where H denotes the Heaviside function, and X(i) is a time series vector, which is defined below, and N denotes the number of time series vectors.

$$X(i)=(x(i), x(i+T), x(i+2T), \ldots, x(i+(d-1)T)) \quad (7)$$

where x(i) is the output of the sensor 110 at time i, d denotes the dimension of the time series vector, T is the time delay, and d, t are set at proper values.

When the correlation integration C(r) possesses the following relation, D is called the correlation dimension.

$$\log C(r)=D \log r+Q \quad (8)$$

where Q is a constant. Therefore, to determine the correlation dimension, the proportional constant D is determined by applying the least square method to the data of log C(r) and log r. The determined D is an approximate value of the correlation dimension.

The fractal dimension calculating circuit 31 is composed of microcomputer, and the output signals from the sensor 110 are always stored in a specific quantity in time series in the memory in the microcomputer, and the calculation of formula (6) and the least square calculation on log C(r) and log r are performed, and the correlation dimension D is determined.

The fractal dimension calculated by the fractal dimension calculating circuit 31 is entered in the indoor fan drive device 2 and compressor drive device 112. As mentioned above, when a fractal dimension of high value is obtained, the room is frequented by many people and is large in the change of activity of people, and therefore the indoor fan drive device 2 powerfully drives the indoor fan 108, and the compressor control circuit 112 more frequently drives the compressor 101. To the contrary, when the fractal dimension is small, the indoor fan 108 and compressor 101 are driven weakly.

Thus, according to the embodiment, the fractal dimension is determined for the time series signal produced from the sensor 110 by using the fractal dimension calculating circuit 31 and the indoor fan 108 and compressor 101 are controlled according to the value, so that the intensity of cooling and heating, and volume of wind blow can be varied minutely.

In the embodiment, the correlation dimension is employed as the calculating method of fractal dimension in the fractal dimension calculating circuit 31, but calculating methods of other dimensions such as information dimension and capacity dimension may be similarly employed. In the embodiment, moreover, the wind direction plate is fixed, but it may be movable as in the sixth embodiment, so as to be variable depending on the value of the fractal dimension calculating circuit 31.

Figure 28:
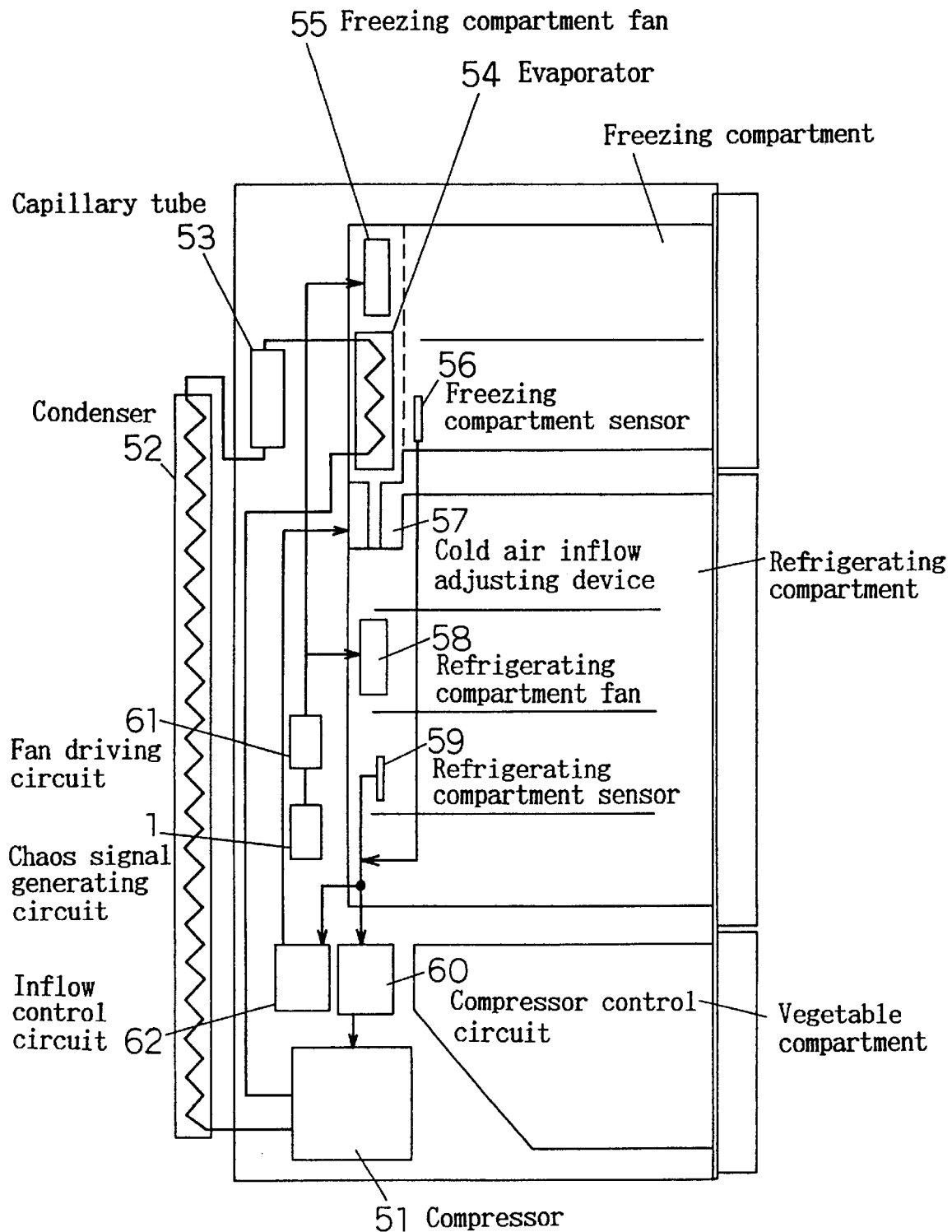
FIG. 28 is a diagram showing a constitution of a refrigerator as a ninth embodiment.

FIG. 28 is a structural diagram of an air-conditioning equipment in a ninth embodiment of the invention, specifically showing a constitution of a refrigerator. The refrigerator, like the air-conditioners mentioned above, is designed to cool the food by generating a cold air by circulating a compressed refrigerant through a heat exchanger or a capillary tube.

Reference numeral 51 in FIG. 28 denotes a compressor for compressing refrigerant such as CFC, 52 is a condenser which is a heat exchanger for releasing the heat of the refrigerant to outside, 53 is a capillary tube composed of a fine copper pipe for passing the high pressure refrigerant supplied from the condenser 52 through a narrow passage to apply pressure so as to lower the pressure of the refrigerant, 54 is an evaporator which is a heat exchanger for replacing the heat of the refrigerant with the heat in the freezing compartment, 55 is a freezing compartment fan for agitating the cold air in the freezing compartment, 56 is a freezing compartment sensor for detecting the temperature in the freezing compartment, 57 is a cold air inflow adjusting device for controlling the flow rate of the cold air generated in the evaporator 54 flowing out from the freezing compartment into the refrigerator, 58 is a refrigerating compartment fan for agitating the cold air in the refrigerating compartment, 59 is a refrigerating compartment sensor for detecting the temperature in the refrigerating compartment, 60 is a compressor control circuit for controlling the output of the compressor 51 according to the detection results of the freezing compartment sensor 56 and refrigerating compartment sensor 59, 61 is a fan drive circuit for controlling the operation of the freezing compartment fan 55 and refrigerating compartment fan 58, 62 is an inflow control circuit for controlling the inflow of the cold air by sending a signal to the cold air inflow adjusting device 57, and 1 is a chaos signal generating circuit same as mentioned in the foregoing embodiments. The thick line in the diagram indicates the pipe through which the refrigerant passes.

In thus constituted refrigerator, the food is refrigerated and frozen in the following procedure.

1. The refrigerant is compressed by the compressor 51, and the refrigerant is set in high temperature, high pressure state.
2. The refrigerant at high temperature, high pressure is sent into the condenser 52 to release heat, and the refrigerant is liquefied.
3. The cooled high pressure liquid refrigerant is passed into the capillary tube 53, and the pressure of the refrigerant is lowered.
4. The refrigerant lowered in pressure is evaporated in the evaporator 54. The refrigerant, when being evaporated, deprives of heat of vaporization, and the air in the evaporator 54 and its vicinity is cooled below the dew point.
5. The cooled air circulates in the freezing compartment by the freezing compartment fan 55, and is sent into the refrigerating compartment. However, the volume of cold air sent into the refrigerating compartment is controlled by the cold air inflow adjusting device 57. In the refrigerating compartment, the refrigerant compartment fan 58 is operated in order to diffuse the cold air in the compartment sufficiently.
6. The refrigerant vaporized in the evaporator 54 is led into the compressor 51, and the operation goes back to step 1.

The food can be cooled in this procedure.

In the conventional refrigerator, the fan rotation was always constant, and the cold air circulates only a same route, and an uneven temperature distribution occurred in the freezing compartment and refrigerating compartment, and excessively cooled area and uncooled area coexisted in the same compartment.

To solve this problem of uneven temperature, the invention realizes uniform freezing and refrigerating without uneven temperature distribution by varying the rotation of the freezing compartment fan 55 and refrigerating compartment fan 58 by chaos signal.

As explained in the sixth embodiment, the chaos signal has a copy image like pie kneading conversion as basic characteristic, and is characterized by trajectory instability, never taking the same state again. Therefore, by varying the rotation of the freezing compartment fan 55 and refrigerating compartment fan 58 by chaos signal, the cold air circulation route in the freezing and refrigerating compartments can be always changed. In this case, the change of cold air circulation route is not regular, but conforms to the chaos signal having trajectory instability, so that the circulation route of cold air appears to change randomly.

By such chaotic change of circulation route of the cold air, preservation of food at uniform temperature may be sufficiently realized.

As a specific constitution, according to the signal generated by the chaos signal generating circuit 1, the fan driving circuit 61 controls the freezing compartment fan 55 and refrigerating compartment fan 58, so that the flow of cold air is changed chaotically. The chaos signal generating circuit 1 is constituted same as in the sixth embodiment, or may be composed of an electric circuit as shown in FIG. 22, or a signal may be generated by a method of calculating a function such as Bernoulli shift by using a microcomputer.

Thus, according to the embodiment, using the chaos signal generating circuit 1, by controlling the freezing compartment fan 55 and refrigerating compartment fan 58 according to the signal, the circulation route of cold air in the freezing and refrigerating compartments can be changed variously, and the temperature distribution in the compartments may be made uniform. Besides, by chaotic drive, the temperature in the freezing compartment and refrigerating compartment is uniform, and generation of excessive cold air is not necessary, so that the power consumption of the refrigerator may be saved more than before.

In the embodiment, only the freezing compartment fan 55 and refrigerating compartment fan 58 are driven by chaos signal, but the operation of the cold air inflow adjusting device 56 and compressor 51 may be controlled according to the chaotic signal, too. In such a case, preservation of food at more uniform temperature than in the embodiment is realized. As chaos signal, an on/off signal as shown in FIG. 23 having a chaotic pulse width may be also used.

Figure 29:
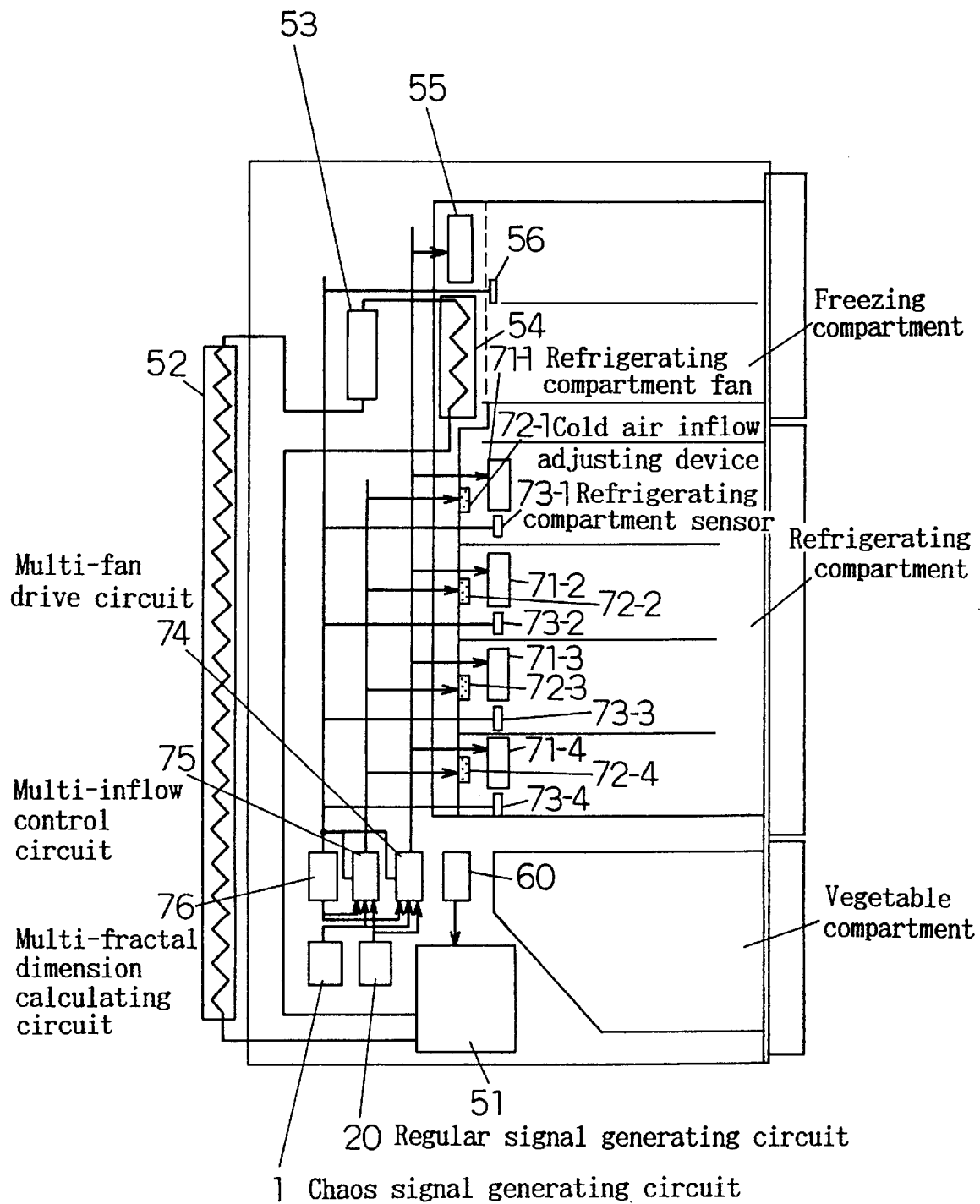
FIG. 29 is a diagram showing a constitution of a refrigerator as a tenth embodiment.

FIG. 29 is a structural diagram of an air-conditioning equipment in a tenth embodiment of the invention, specifically showing the constitution of a refrigerator.

In FIG. 29, reference numeral 51 is a compressor, 52 is a condenser, 53 is a capillary tube, 54 is an evaporator, 55 is a freezing compartment fan, and 56 is a freezing compartment sensor. So far, they are same as in the constitution in the ninth embodiment. Besides, reference numeral 1 denotes a chaos signal generating circuit, and 2 is a regular signal generating circuit, which are same as those shown in the foregoing embodiments. In this embodiment, what differs from the constitution of the ninth embodiment is that a refrigerating compartment fan 71, a cold air inflow adjusting device 72, and a refrigerating compartment sensor 73 are each provided in a plurality and distributed and disposed on each rack in the refrigerating compartment, and that the constitution further comprises a multi-fractal dimension calculating circuit 76 for calculating the individual fractal dimensions from the outputs of the freezing compartment sensor 58 and refrigerating compartment sensors 73-1 to 73-4, a multi-fan driving circuit 74 for controlling the freezing compartment fan 55 and refrigerating compartment fans 71-1 to 71-4 according to the signals from the freezing compartment sensor 55, refrigerating compartment sensor 73, and multi-fractal dimension calculating circuit 76, depending on the output of either the chaos signal generating circuit 1 or regular signal generating circuit 20, and a multi-inflow control circuit 75 for controlling the cold air inflow adjusting devices 72-1 to 72-4 according to the signals from the freezing compartment sensor 55, refrigerating compartment sensor 73, and multi-fractal dimension calculating circuit 76, depending on the output of either the chaos signal generating circuit 1 or regular signal generating circuit 20.

In the foregoing ninth embodiment, it is controlled with the purpose of keeping uniform the temperature in the refrigerator. In the refrigerator, maintenance of uniform temperature is most important, but control to keep uniform temperature only involves certain problems.

For example, in a sufficiently uniformly cooled refrigerating compartment, suppose a warm food is put on one rack. In this case, the fan in the refrigerating compartment operates to make uniform the temperature of the entire refrigerating compartment, and the temperature propagation in the room is promoted, and the temperature goes on rising around the warm food, and as the time passes, the temperature rise spreads around the whole compartment, and then this temperature rise is detected by the sensor, and the cold air from the freezing compartment is increased, and the temperature drops on the whole, thereby returning to the state before putting in the warm food.

Therefore, ever time a new food is put in, the temperature of the entire refrigerating compartment varies, which may adversely affect the food preservation state.

To solve this problem, in this embodiment, on each rack in the refrigerating compartment, the refrigerating compartment sensor 73, cold air inflow adjusting device 72, and refrigerating compartment fan 71 are provided, and the temperature is always detected on each rack, and the rack higher in temperature than the other racks is exposed to cold air by regularly operating the refrigerating compartment fan 71, so that the particular rack is cooled quickly. When the temperature is almost equal on each rack, each refrigerating compartment fan is driven by chaos signal, so that the compartment temperature may be kept uniform.

As a specific operation, the temperature on each rack is detected by the refrigerating compartment sensors 73-1 to 73-4, and the information is put in the multi-fractal dimension calculating circuit 76. The multi-fractal dimension calculating circuit 76 is composed same as the fractal dimension calculating circuit 31 explained in the eighth embodiment, and the different point is only that plural input signals are used. By this multi-fractal dimension calculating circuit 76, the fractal dimension is calculated from the data produced from the refrigerating compartment sensors 73. By this fractal dimension, it is known which rack is large in temperature change and high in frequency of temperature change. Therefore, by calculating the fractal dimension, specifically, the feature amounts showing the information about the frequency or volume of putting in and taking out the food on each rack.

The fractal dimension of temperature data on each rack obtained by the multi-fractal dimension calculating circuit 76, and the present temperature data on each rack are entered in the multi-inflow control circuit 75 and multi-fan driving circuit 74, thereby driving and controlling the cold air inflow adjusting circuits 72-1 to 72-4 and refrigerating compartment fans 73-1 to 73-4 installed on each rack.

As a basic control, the rack presently high in temperature or the rack high in fractal dimension is filled with more cold air by means of the cold air inflow adjusting device 72. Moreover, the refrigerating compartment fan 71 on that rack is driven by the regular signal generating circuit 20, and the fan is controlled so that cold air may be directly applied to the warm food. By this operation, spot cooling of cooling a particular food quickly and locally is realized.

On the other hand, the rack close to the target temperature or the rack small in fractal dimension is exposed to less cold air flow, and the refrigerating compartment fan 71 is operated according to the output of the chaos signal generating circuit 1, thereby controlling to have a uniform temperature distribution in the entire refrigerating compartment. These practical controls of fans and cold air inflow adjusting device are effected by the multi-fan driving circuit 74 and multi-inflow control circuit 75.

In this way, the refrigerating compartment fans 71-1 to 71-4, cold air inflow adjusting devices 72-1 to 72-4, and refrigerating compartment sensors 73-1 to 73-4 are provided on the racks of the refrigerating compartment, and by changing over the driving state of the refrigerating compartment fans 71-1 to 71-4 between chaotic state and regular state, the control for making uniform the temperature in the entire refrigerating compartment and the control for spot cooling of each rack can be changed over. For changeover of the controls, not only the present temperature detected from the outputs of the refrigerating compartment sensors 73-1 to 73-4, but also the fractal dimensions calculated from the sensor outputs are used. Therefore, control in consideration of volume of food putting in and taking out can be also realized.

Similar effects are obtained by changing over the driving state of the cold air inflow adjusting devices 72-1 to 72-4 between chaotic state and regular state, same as in the refrigerating compartment fans 71-1 to 71-4.

Figure 30:
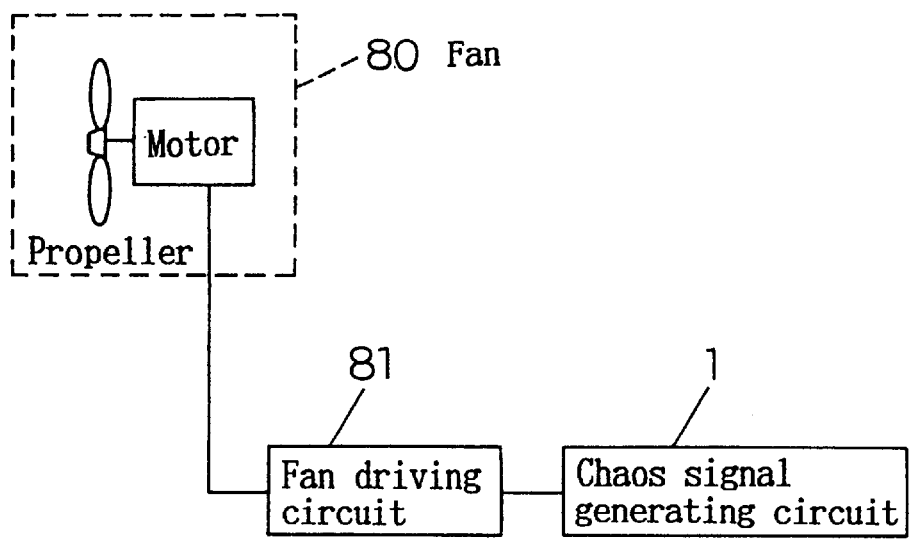
FIG. 30 is a diagram showing a constitution of an electric fan as an eleventh embodiment.

FIG. 30 is a structural diagram of an air-conditioning equipment in an eleventh embodiment of the invention, specifically showing the constitution of an electric fan.

In FIG. 30, reference numeral 80 is a fan composed of propeller and motor, and 81 is a fan driving circuit for feeding an electric power to drive the fan and controlling the rotating speed of the fan . Reference numeral 1 is a chaos signal generating circuit same as in the constitution in FIG. 6.

In this embodiment, same as in the sixth embodiment, a uniform air-conditioning is realized by chaotically changing the rotating speed of the fan 80 by using the chaos signal generating circuit 1.

As explained also in the sixth embodiment, the chaos signal has a mapping like pie kneading conversion as basic characteristic, and is characterized by trajectory instability, never repeating the same state change again. Therefore, by varying the output of the fan 85 according to the chaos signal, the wind intensity and wind circulation route in the room can be always changed, so that a uniform air-conditioning is realized.

Thus, according to the embodiment, using the chaos signal generating circuit 1, by controlling the fan 80 of the electric fan according to the signal, the wind intensity of the fan and the circulation route of the wind can be changed variously, and the temperature distribution in the room can be made uniform. In the embodiment, only the rotation of the fan 80 is changed by chaos signal, but similar effects are obtained by varying the swing rotation of the electric fan by chaos signal.

Figure 31:
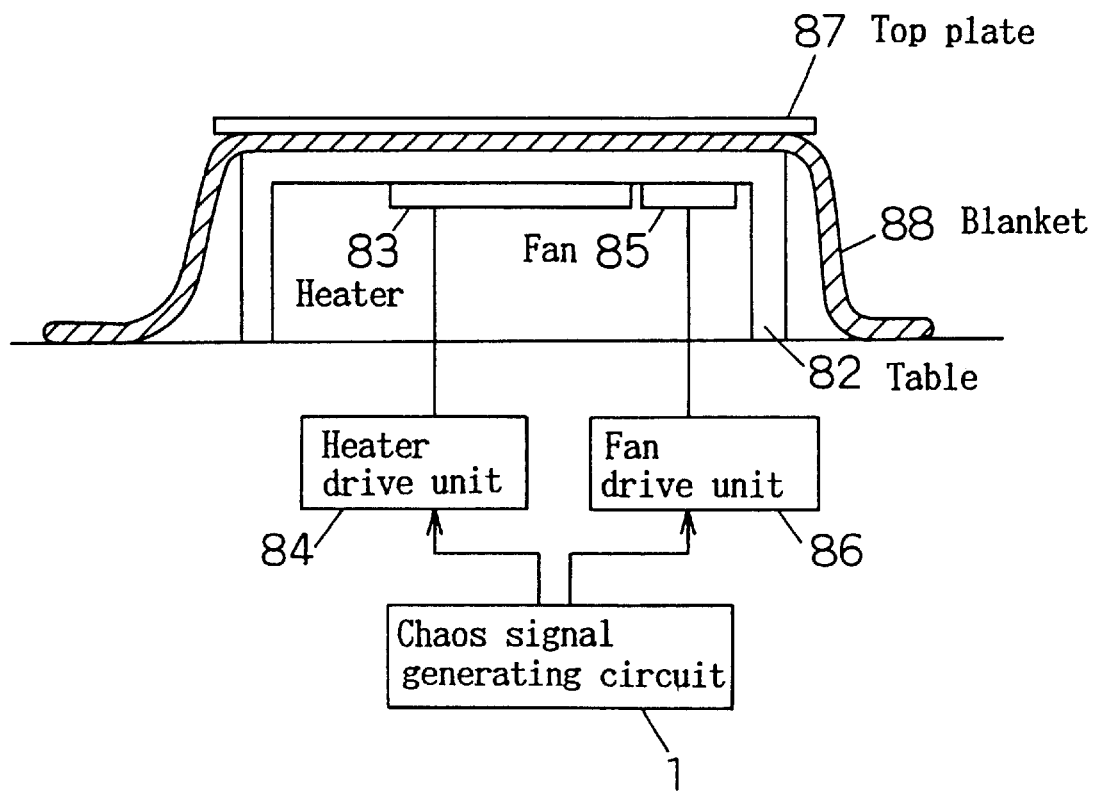
FIG. 31 is a diagram showing a constitution of an electric heated table as a twelfth embodiment.

FIG. 31 is a structural diagram of an air-conditioning equipment in a twelfth embodiment of the invention, specifically showing the constitution of an electric heated table.

In FIG. 31, reference numeral 82 is a table, 83 is a heater built in the back of the table, 84 is a heater drive unit for feeding electric power necessary for heat generation to the heater 83 and controlling the h eat generation output of the heater 83, 85 is a fan for agitating the air in the electric heated table, 86 is a fan drive unit for driving and controlling the fan 85, 87 is a table top plate, and 88 is a blanket. Reference numeral 1 is a chaos signal generating circuit, same as in the constitution in the sixth embodiment.

In this embodiment, same as in the sixth embodiment, the heat generation output of the heater 83 and the air flow rate of the fan 85 are chaotically changed by using the chaos signal generating circuit 1. Thus, a uniform heating is realized. As explained also in the sixth embodiment, the chaos signal has a mapping like pie kneading conversion as basic characteristic, and is characterized by trajectory instability, never repeating the same state change again. Therefore, by varying the output of the heater 83 and output of the fan 83 according to the chaos signal, the temperature, intensity of hot air, and circulation route of hot air in the electric heated table are always changed, so that a uniform heating is realized.

Thus, according to the embodiment, using the chaos signal generating circuit 1, by controlling the heater 82 and fan 85 of the electric heated table according to the signal, the intensity and circulation route of hot air in the electric heated table may be changed variously, so that the temperature distribution in the electric heated table may be made uniform.

Figure 32:
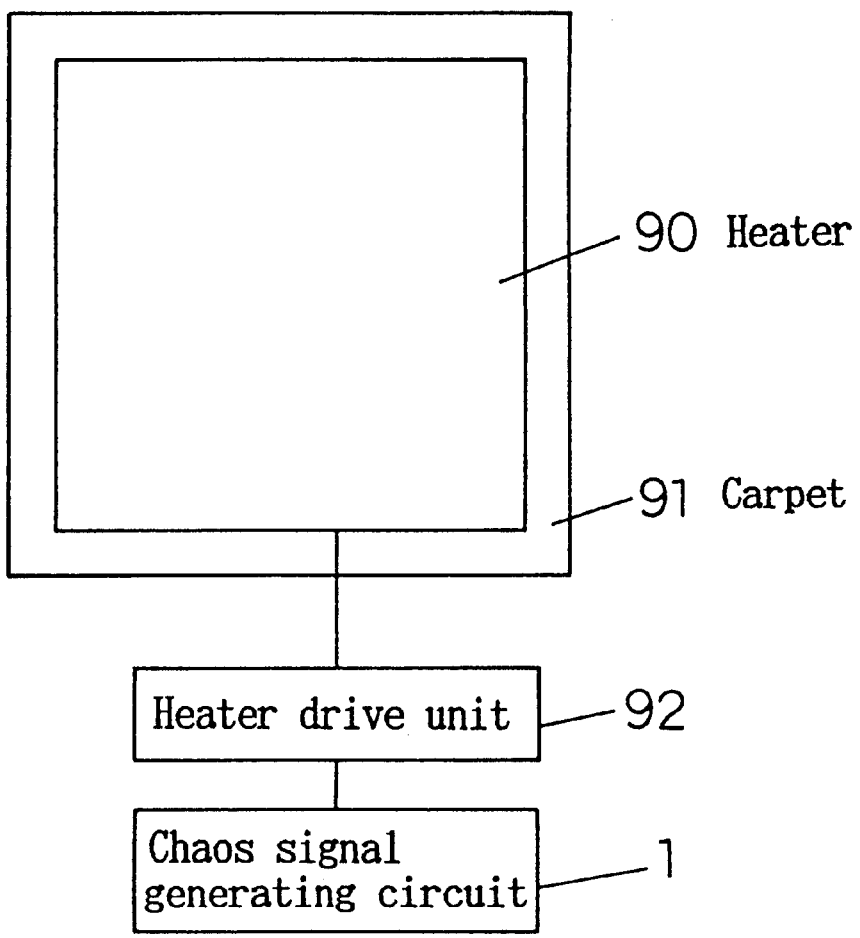
FIG. 32 is a diagram showing a constitution of an electronic carpet.

As the signal of chaos signal generating circuit 1, incidentally, an on/off signal as shown in FIG. 23 may be used, and its pulse width may be varied chaotically, or an intermittent chaos signal may be used. As a heating apparatus using similar heater, an electronic carpet as shown in FIG. 32 is known, and the principle is the same. In FIG. 32, reference numeral 90 denotes a heater, 91 is a carpet heated by the heater, 92 is a heater drive unit for feeding electric power necessary for heat generation to the heater 90, and controlling the heat generation output, and 1 is a chaos signal generating circuit same as in the sixth embodiment. By controlling the heat generation output of the heater 90 according to the chaos signal produced from the chaos signal generating circuit 1, heating without uneven temperature profile is realized same as in the electric heated table. The same effect is obtained in other heating devices using the heater, including the oil fan heater, ceramic fan heater, electric stove, and electric blanket, and uniform heating is realized by controlling the heater chaotically.

Figure 33:
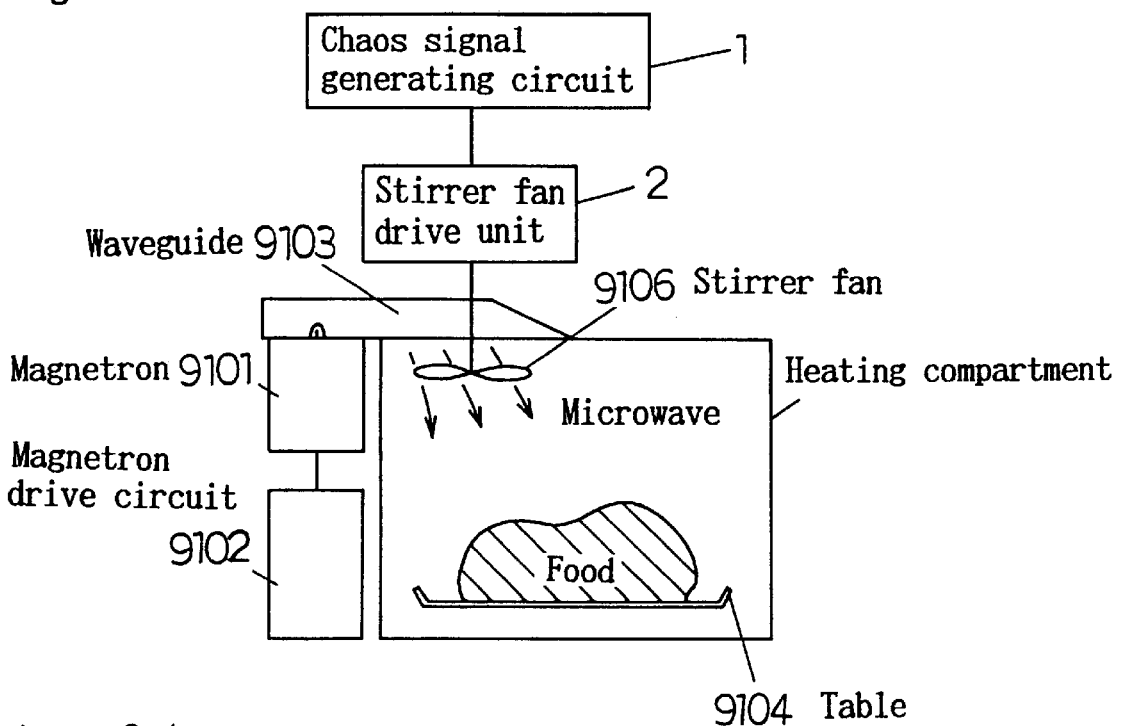
FIG. 33 is a diagram showing a constitution of a microwave oven as a thirteenth embodiment.

FIG. 33 is a structural diagram of a thirteenth embodiment of the invention, specifically showing the constitution of a microwave oven.

In FIG. 33, reference numeral 9101 denotes a magnetron for generating microwaves, 9102 is a magnetron driving circuit composed of a power source circuit and a control circuit for driving the magnetron 9101, 9103 is a waveguide for guiding the microwaves generated by the magnetron 9101 into a heating compartment in which the food is contained, 9104 is a table for putting the food on, and 9106 is a stirrer fan for agitating the microwaves coming out from the waveguide 9103, and these are so far same as those in the existing microwave oven. What differs from the prior is the provision of a chaos signal generating circuit 1 for generating a chaos signal, and a stirrer fan drive unit 2 for controlling the rotation of the stirrer fan 9106 according to the output of the chaos signal generating circuit 1.

As explained also in the sixth embodiment, the chaos signal has a mapping like pie kneading conversion as basic characteristic, and is characterized by trajectory instability, never repeating the same state change again. In proportion to such chaos signal, the stirrer fan 9106 of the microwave oven is rotated, and the stirrer fan 9106 operates in various modes, so that the microwaves in the compartment can be agitated sufficiently. Therefore, as compared with the conventional microwave oven having a stirrer fan rotating at a specific speed, a more uniform distribution of electric field in the compartment is obtained.

The chaos signal generating circuit 1 in FIG. 33 is composed of an electric circuit for generating a chaos signal. In specific constitution, for example, the signal may be produced by calculating formula (5) by microcomputer, or an electric circuit as in FIG. 22 may be used. As the chaos signal to be generated from the chaos signal generating circuit 1, an on/off signal as shown in FIG. 23 may be used, and its pulse intervals t1, t2, . . . may be time series signals of chaos.

The stirrer fan drive unit 2 in FIG. 33 is a device for varying the rotating speed of the stirrer fan in proportion to the output of the chaos signal generating circuit 1. By putting the motion of the stirrer fan in chaotic state by the stirrer fan drive unit 2, the stirrer fan can be put in various operating states. As a result, the microwaves in the compartment may be sufficiently agitated, and the distribution of electric field in the compartment may be made uniform, same as in the pie kneading conversion.

Figure 34:
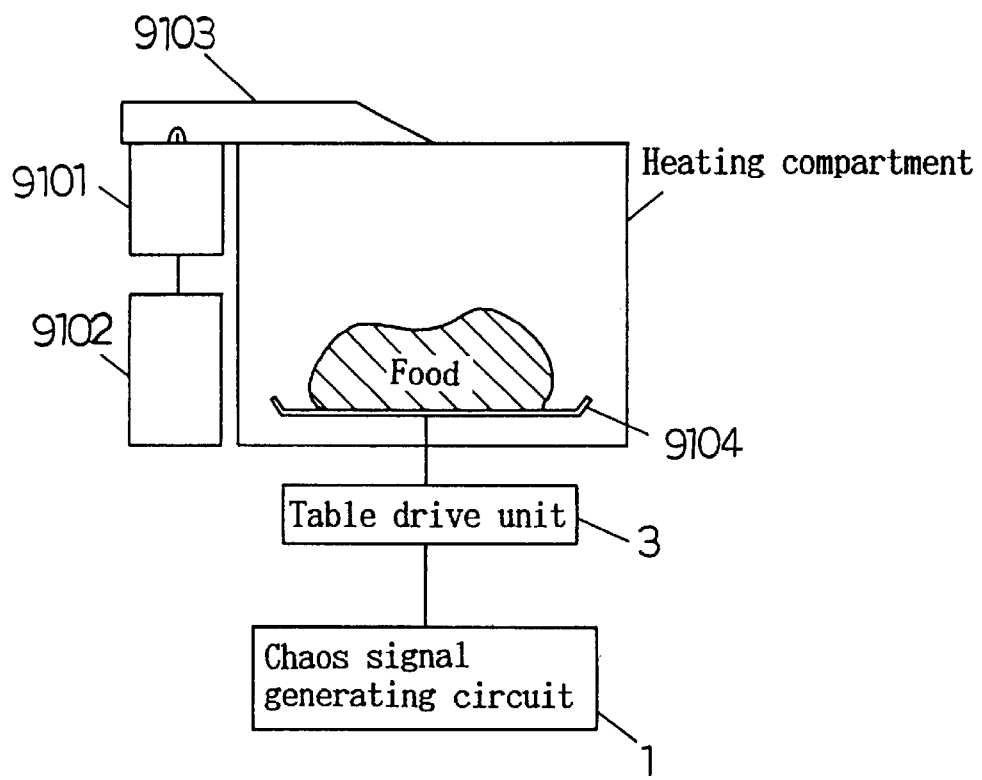
FIG. 34 is a diagram showing a constitution of a microwave oven for driving the table chaotically.
Figure 35:
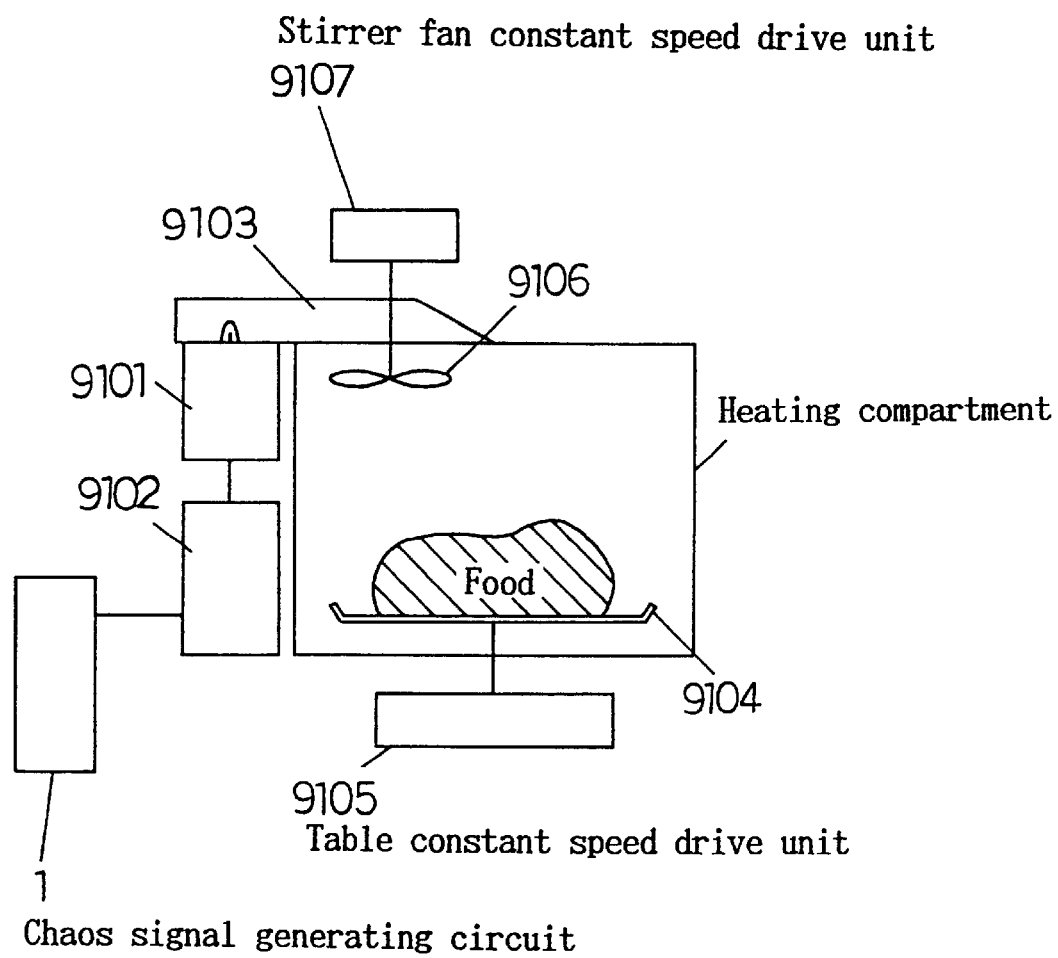
FIG. 35 is a diagram showing a constitution of a microwave oven for driving the magnetron chaotically.

Thus, according to the embodiment, the rotating speed of the stirrer fan 9106 is varied by the chaos signal, and same effects are obtained by connecting the chaos signal generating circuit 1 to the table drive unit 3 for rotating the table 9104 as shown in FIG. 34, and changing the rotating speed or rotational angle of the table 9104 by the chaos signal. Besides, as shown in FIG. 35, by connecting the magnetron driving circuit 9102 to the chaos signal generating circuit 1, the intensity of the produced microwaves may be varied according to the chaos signal.

Figure 36:
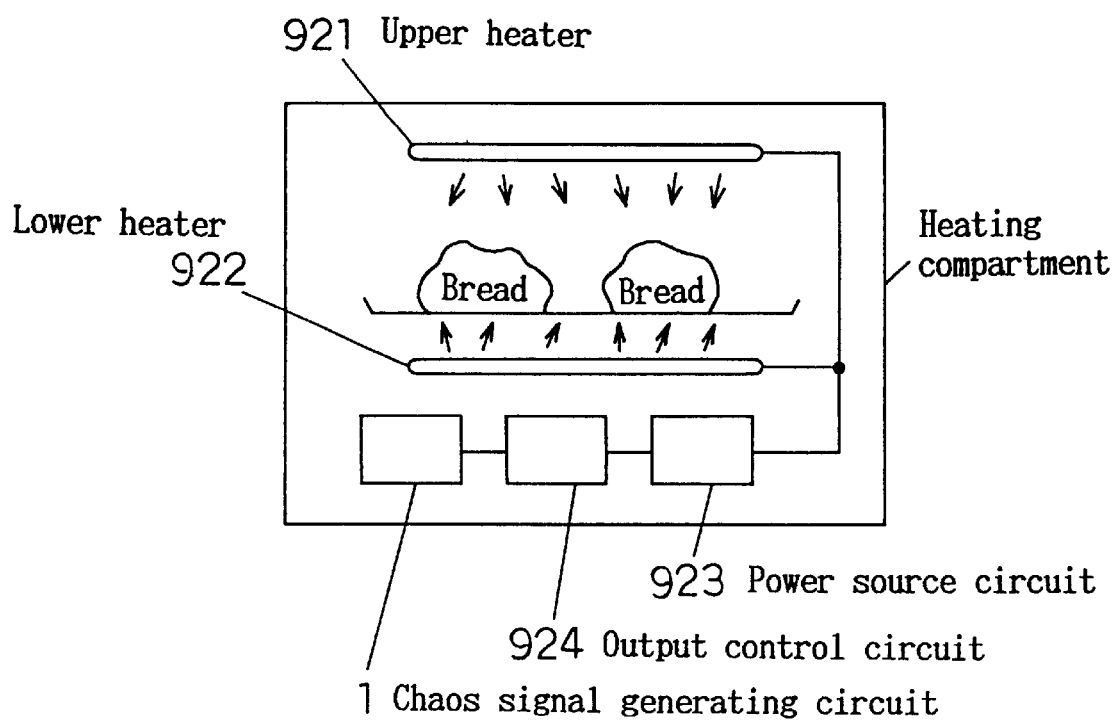
FIG. 36 is a diagram showing a constitution of an oven-toaster for changing the output of the heater chaotically.

The thirteenth embodiment relates to the microwave oven, but same effects are obtained in an oven-toaster as shown in FIG. 36. FIG. 36 shows an oven-toaster, in which reference numeral 921 denotes an upper heater for heating the bread in the heating compartment from above, 922 is a lower heater for heating the bread from beneath, 923 is a power source circuit for feeding electric power to the upper heater 921 and lower heater 922, 924 is an output control circuit for controlling the output of the power source circuit 923, and 1 is a chaos signal generating circuit same as in the foregoing embodiments. In this example, according to the chaos signal generated from the chaos signal generating circuit 1, the output control circuit 924 controls the output of the power source circuit 923, and the outputs of the two heaters are changed chaotically. Hence, same as in the above embodiment, uniform heating is realized.

Figure 37:
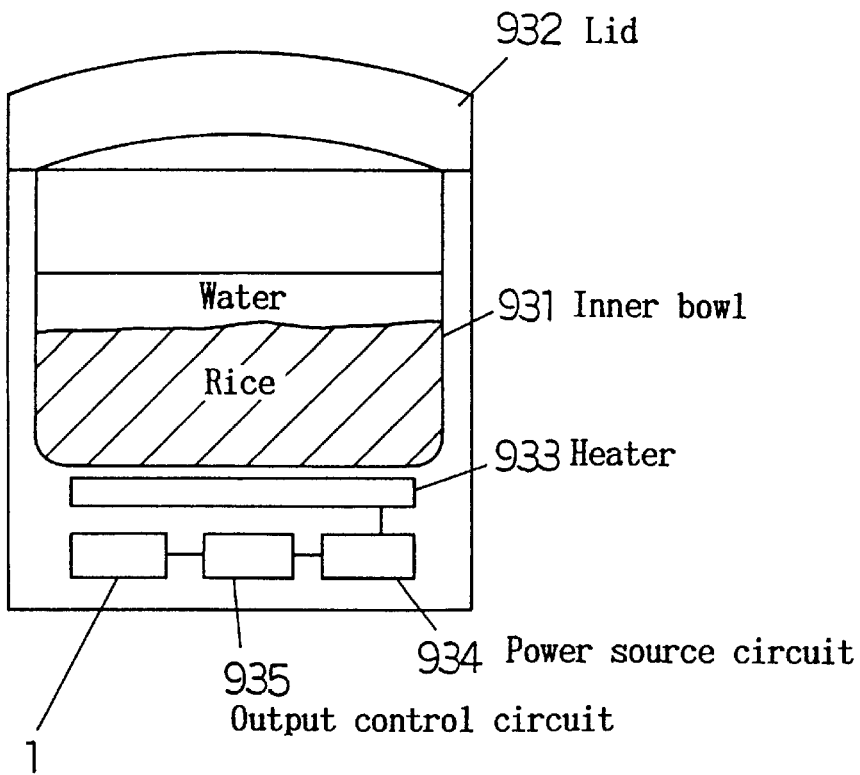
FIG. 37 is a diagram showing a constitution of a rice cooker as a fourteenth embodiment.

FIG. 37 is a structural diagram of a heating apparatus in a fourteenth embodiment of the invention, specifically showing the constitution of a rice cooker.

In FIG. 37, reference numeral 931 is an inner bowl for holding rice and water, 932 is a lid for enclosing the inner bowl, 933 is a heater for heating the inner bowl 931, 934 is a power source circuit for feeding electric power necessary for heat generation to the heater 933, 935 is an output control circuit for controlling the output of the power source circuit 934 for changing the heating output, and 1 is a chaos signal generating circuit for generating a chaos signal same as used in the sixth embodiment.

The rice cooker is intended to cook rice by operating the rice in the inner bowl in four sequentially steps of process consisting of water absorption, boiling, maintenance of boiling, and steaming. Accordingly, the heater 933 disposed around the inner bowl (lower, side or top surface) heats the rice in the inner bowl with various outputs depending on the steps of the process.

Recently, a new rice cooker is developed, in which several temperature sensors are provided on the inner circumference or outer circumference of the inner bowl, and the volume of rice is judged on the basis of the temperature information obtained from the sensors, and the heating output of the heater in each step of process is determined from the obtained volume.

Once the heating output is determined, however, the heating output at each step of process is fixed, and the heater output does not change in the process.

In the inner bowl, as heated by the heater 933, water (hot water) circulates among rice grains. The direction of circulation is mainly vertical, and the water circulation is particularly violent in the process of boiling and maintenance of boiling. By such circulation of water, the rice temperature in the inner bowl is kept uniform.

Conventionally, however, since the output of the heater 933 is kept constant at each step of the process, once the circulation route of water (hot water) is determined depending on the physical configuration of rice grains and heater position, the route is not changed, and the rice close to the route is overcooked, and the rice remote from the route is undercooked, and uneven cooking occurs.

This phenomenon is particularly notable at the steps of boiling and maintenance of boiling in which the heating output is large and water circulation is violent, and a significant uneven cooking is caused in a rice cooker with inappropriate design of heater position or shape.

To solve the problem of uneven cooking, in the invention, the output of the heater 933 is changed by chaos signal, and uniform cooking without uneven heating is realized.

As explained also in the sixth embodiment, the chaos signal has a mapping like pie kneading conversion as basic characteristic, and is characterized by trajectory instability, never repeating the same state change again. Therefore, by changing the output of the heater 933 according to the chaos signal, the water circulation route in the inner bowl 931 may always changed. Besides, the change of water (hot water) circulation route is not regular, but conforms to the chaos signal having trajectory instability. Hence, the water circulation route appears to change variously at random.

By such chaotic change of water circulation route, a sufficiently uniform rice cooking is realized.

As a practical constitution, the output control circuit 935 controls the power source circuit 934 according to the signal generated by the chaos signal generating circuit 1, and the heater output is changed chaotically. The chaos signal generating circuit 1 is constituted same as in the sixth embodiment, and an electric circuit as shown in FIG. 22 may be used, or a signal may be generated by a method of calculating a function such as Bernoulli shift by using a microcomputer or the like.

Thus, according to the embodiment, using the chaos signal generating circuit 1, by controlling the heater 933 of the rice cooker according to the signal, the water circulation route in the inner bowl may be changed variously, and the rice temperature distribution may be made uniform. Hence uniform rice cooking without uneven heating is realized.

Incidentally a rice cooker by making use of induction heat of inner bowl by using a magnetic force generating coil as heater 933 is developed. In such rice cooker, too, by changing the heating output chaotically by using the chaos signal generating circuit 1, uniform cooking without uneven heating as in this embodiment may be realized.

Figure 38:
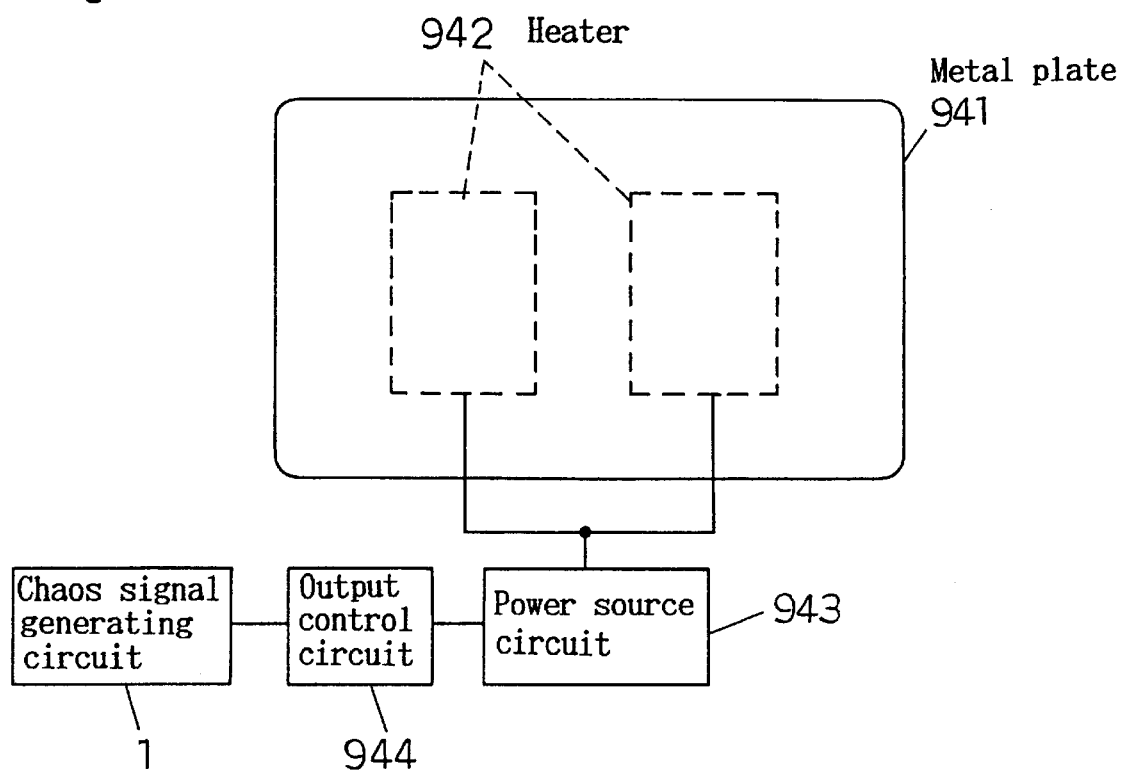
FIG. 38 is a diagram showing a constitution of a hot plate as a fifteenth embodiment.

FIG. 38 is a structural diagram of a heating apparatus in a fifteenth embodiment of the invention, specifically showing the constitution of a hot plate.

In FIG. 38, reference numeral 941 is a metal plate for putting the food on, 942 is a heater for heating the metal plate 941, 943 is a power source circuit for feeding electric power necessary for generating heat to the heater 942, 944 is an output control circuit for controlling the output of the power source circuit 943 for changing the heat generation output of the heater 942, and 1 is a chaos signal generating circuit for generating a chaos signal same as in the sixth embodiment.

On the lower side of the metal plate 941, plural heaters 942 are disposed as shown in the diagram, and the metal plate 941 is heated as the electric power is supplied to each heater 942 through the power source circuit 943.

In an ordinary hot plate, the heaters 942 are often disposed at several positions of the metal plate as shown in the diagram, never covering the entire metal plate surface. Therefore, a heat distribution occurs on the metal plate.

In this embodiment, same as in the sixth embodiment, by chaotically changing the heating output of the heater by using the chaos signal generating circuit 1, uniform heating is realized.

As explained also in the sixth embodiment, the chaos signal has a mapping like pie kneading conversion as basic characteristic, and is characterized by trajectory instability, never repeating the same state change again. Therefore, by changing the output of the heater 942 according to the chaos signal, the temperature of the parts of the metal plate 941 and the heat propagation speed are always changed, so that a uniform heating is realized.

Thus, according to the embodiment, using the chaos signal generating circuit 1, by controlling the heater 942 of the hot plate according to the signal, the heat distribution on the metal plate may be changed variously, and the temperature distribution on the metal plate made uniform. Hence, cooking without uneven heating is realized.

As the signal of the chaos signal generating circuit 1, an on/off signal as shown in FIG. 23 may be used, and the pulse width may be varied chaotically. In this case, too, the heater is on/off controlled, but the temperature of the parts of the metal plate changes smoothly because of the heat capacity of the metal plate. Accordingly, if the signal as in FIG. 23 is used, uniform heating is possible.

Figure 39:
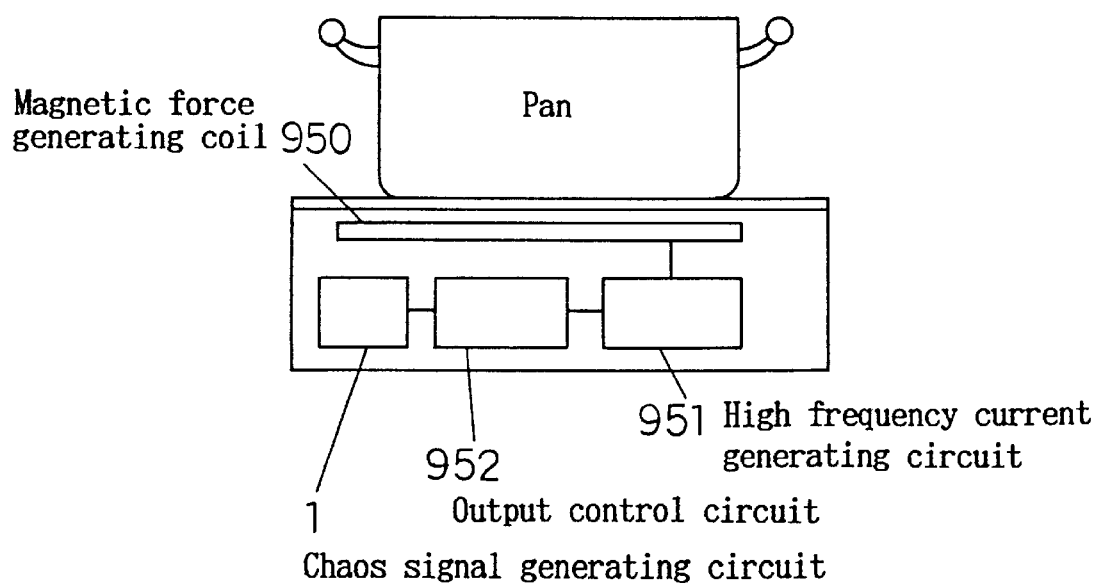
FIG. 39 is a diagram showing a constitution of an electromagnetic cooking apparatus as a sixteenth embodiment.

FIG. 39 is a structural diagram of a heating apparatus in a sixteenth embodiment of the invention, specifically showing the constitution of an electromagnetic cooking apparatus.

In FIG. 39, reference numeral 950 is a magnetic force generating coil, 951 is a high frequency current generating circuit composed of a power source circuit for producing a high frequency current to be supplied to the magnetic force generating coil 950, and 952 is an output control circuit for controlling the output of the high frequency current produced from the high frequency current generating circuit 951. Reference numeral 1 in FIG. 39 is a chaos signal generating circuit, which is same as in the sixth embodiment.

The electromagnetic cooking apparatus is a heating device for cooking by passing an eddy current in a pan by an alternating magnetic force generated by the magnetic force generating coil 950, and making use of the heat generation (induction heating) by the metal resistance of the pan.

Similar to the hot plate in the fifteenth embodiment, the problem of the electromagnetic cooking apparatus is that the heating is not sufficiently uniform. In the electromagnetic cooking apparatus, since the pan itself is heated, the magnitude and distribution of the eddy current induced on the pan vary significantly depending on the pan shape, material and thickness, in particular, the contact state between the pan bottom and the main body. Hence, uneven cooking occurred in this type of electromagnetic cooking apparatus.

In this embodiment, same as in the foregoing embodiments, the output of the high frequency current generating circuit 951 is changed chaotically by using the chaos signal generating circuit 1, so that uniform heating and cooking may be realized. As explained also in the sixth embodiment, the chaos signal has a mapping like pie kneading conversion as basic characteristic, and is characterized by trajectory instability, never repeating the same state change again. Therefore, by varying the output of the high frequency current generating circuit 951 according to the chaos signal, the magnitude of the eddy current in the parts of the pan, and the heat conduction state are always changed, so that a uniform heating is enabled.

Thus, according to the embodiment, using the chaos signal generating circuit 1, by controlling the high frequency current generating circuit 951 according to the signal, the magnitude of the eddy current induced in the pan and the heat conduction state can be variously changed, and hence the temperature distribution in the pan may be made uniform. As a result, uniform cooking without uneven heating is realized.

As the signal of the chaos signal generating circuit 1, incidentally, the on/off signal as shown in FIG. 6 may be used, and the same effects are obtained by changing the its pulse width chaotically.

According to the invention, as described herein, by putting the object machine in chaotic state, uniform washing, air-conditioning, heating or the like may be realized.

What is claimed is:

1. A rice cooker comprising:

a bowl for accommodating rice and water, a heater disposed outside of the bowl for heating the bowl, a power source circuit for supplying a output power to the heater, a chaos signal generating circuit for generating a deterministic chaos signal, and an control circuit coupled between the chaos signal generating circuit and the power source circuit for varying the output power of the power source circuit based on the deterministic chaos signal, wherein the deterministic chaos signal is selected for sufficiently varying the output power of the power source circuit to increase uniformity of heating of the bowl.

2. The magnetic field control apparatus of claim 1, wherein the magnetic field characteristic includes at least one of a positional distribution, a magnetic flux density, and a line of magnetic force of the electromagnetic wave.

3. The rice cooker of claim 1 wherein the bowl is disposed within a compartment and includes water circulation paths for the water, and the deterministic chaos signal is selected for sufficiently varying the output power and sufficiently varying the trajectory of the water in the water circulation paths.

4. The rice cooker of claim 1 wherein the chaos signal generating circuit provides a pulsed ON/OFF signal having pulsed-on intervals of variable duration in a chaotic state.

5. The rice cooker of claim 1, wherein the chaos signal generating circuit provides the deterministic chaos signal, as a function of determining that a chaos trajectory is present based on an index of chaotic state.

6. The rice cooker of claim 5, wherein the index of chaotic state is selected from a group consisting of a Lyapunov exponent and a fractal dimension.

7. The rice cooker of claim 5, wherein the index of chaotic state is a Lyapunov exponent; and a value of the Lyzpunov exponent is set to have a positive value not close to zero to maintain the chaotic trajectory.

8. A method of a rice cooker having a bowl to accommodate rice and water to be heated, a heater to generate heat energy to the bowl an electric supply to apply electric power to the heater, and a controller to vary the electric power applied to the heater, the method comprising the steps of:

(a) generating a deterministic chaotic signal;

(b) controlling the electric power applied to the heater in response to the deterministic chaotic signal of step (a);

(c) adjusting characteristic of the deterministic chaotic signal to increase uniformity of the heat energy in the bowl; and (d) selecting the characteristic in step (c) to sufficiently vary the heat energy and increase the uniformity of the heat energy in the bowl.

9. In a rice cooker having a heater for generating heat energy, an electric supply to provide electric power to the heater, a bowl to accommodate rice and water, and water circulation paths in the bowl, a method for applying the energy to the bowl comprising the steps of:

(a) generating a deterministic chaotic signal;

(b) controlling the electric power supplied to the heater in response to the deterministic chaotic signal generated in step (a);

(c) adjusting a characteristic of the deterministic chaotic signal to increase uniformity and space-filling of the chaotic trajectory; and (d) selecting the characteristic based on adjusting step (c) to sufficiently increase uniformity and space-filling and thus densely filling up the water in the circulation paths with the heat energy.

10. The method of claim 9, wherein adjusting step (c) includes adjusting the characteristic of the deterministic chaotic signal by determining that a chaos trajectory is present based on an index of chaotic state.

11. The method of claim 8 or 9, wherein step (a) includes providing a pulsed ON/OFF signal, and adjusting pulsed-on intervals to have variable duration in a chaotic state.

* * * * *

UNITED STATES PATENT AND TRADEMARK OFFICE
CERTIFICATE OF CORRECTION

PATENT NO.    : 6,417,497 B2
DATED         : July 9, 2002
INVENTOR(S)   : Nomura et al.

It is certified that error appears in the above-identified patent and that said Letters Patent is hereby corrected as shown below:

Column 29,
Lines 50-53, delete "claim 2".

Signed and Sealed this

Twenty-fourth Day of December, 2002

JAMES E. ROGAN
*Director of the United States Patent and Trademark Office*